(12) United States Patent
Okuyama

(10) Patent No.: US 9,891,611 B2
(45) Date of Patent: Feb. 13, 2018

(54) CUTTING APPARATUS AND NON-TRANSITORY COMPUTER-READABLE MEDIUM

(71) Applicant: BROTHER KOGYO KABUSHIKI KAISHA, Nagoya-shi (JP)

(72) Inventor: Tsuneo Okuyama, Inabe-gun (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 629 days.

(21) Appl. No.: 14/445,692

(22) Filed: Jul. 29, 2014

(65) Prior Publication Data

US 2015/0032249 A1    Jan. 29, 2015

(30) Foreign Application Priority Data

Jul. 29, 2013    (JP) ................. 2013-156685

(51) Int. Cl.
*G05B 19/18*    (2006.01)
*B26D 7/26*    (2006.01)

(52) U.S. Cl.
CPC .... *G05B 19/182* (2013.01); *B26D 2007/2678* (2013.01); *G05B 2219/45038* (2013.01)

(58) Field of Classification Search
CPC ............ B26D 2007/2678; G05B 19/18; G05B 19/182; G05B 2219/45038; G05B 2219/45189; G05B 2219/49388
USPC .................. 33/18.1, 32.3; 700/114, 117, 134
See application file for complete search history.

(56) References Cited

U.S. PATENT DOCUMENTS

| | | | |
|---|---|---|---|
| 5,474,002 A | * | 12/1995 | Goto ..................... D05B 19/02 112/102.5 |
| 5,727,485 A | | 3/1998 | Morita |
| 5,752,458 A | | 5/1998 | Morita |

(Continued)

FOREIGN PATENT DOCUMENTS

| | | |
|---|---|---|
| JP | H09-111637 A | 4/1997 |
| JP | H09-111638 A | 4/1997 |

(Continued)

OTHER PUBLICATIONS

Notification of Reasons for Rejection dated Apr. 4, 2017 issued in the corresponding Japanese application No. 2013-156685.

*Primary Examiner* — Stephen Choi
*Assistant Examiner* — Evan MacFarlane
(74) *Attorney, Agent, or Firm* — K&L Gates LLP

(57) ABSTRACT

A cutting apparatus includes a platen configured to receive and object, a cutting device having a cutter, a first moving mechanism configured to move the cutter so that the cutter comes close to or departs from the platen, and a second moving mechanism configured to move the object and the cutter on the platen relative to each other. The apparatus further includes a display unit and a control device. The control device is configured to cause the apparatus to obtain lengths of line segments composing a cutting line of the pattern for every line segment, to calculate a time length required to cut each line segment, to calculate a cutting time length required to cut the pattern by accumulating the time lengths required to cut the respective line segments, and to cause the display unit to display a calculated cutting time length required to cut the pattern.

16 Claims, 14 Drawing Sheets

(56) References Cited

U.S. PATENT DOCUMENTS

| | | | | |
|---|---|---|---|---|
| 7,324,861 | B1* | 1/2008 | Zheng | H05K 3/1225 |
| | | | | 700/117 |
| 9,333,663 | B2* | 5/2016 | Okuyama | B26D 5/00 |
| 2005/0052659 | A1* | 3/2005 | Jacobsen | H04N 1/0035 |
| | | | | 358/1.1 |
| 2005/0206950 | A1* | 9/2005 | Ushiro | H04N 1/00132 |
| | | | | 358/1.15 |
| 2009/0000444 | A1* | 1/2009 | Johnson | B26D 7/2614 |
| | | | | 83/76.1 |
| 2013/0008292 | A1 | 1/2013 | Kawaguchi et al. | |
| 2015/0027285 | A1 | 1/2015 | Okuyama | |

FOREIGN PATENT DOCUMENTS

| | | |
|---|---|---|
| JP | H09-164523 A | 6/1997 |
| JP | 2004-261916 A | 9/2004 |
| JP | 2005-279957 A | 10/2005 |
| JP | 2007-125627 A | 5/2007 |
| JP | 2010-516489 A | 5/2010 |
| JP | 2013-013976 A | 1/2013 |
| JP | 2015-024482 A | 2/2015 |

* cited by examiner

| PATTERN NUMBER n | |
|---|---|
| PATTERN A1 | FEED DATA (F1x0,F1y0) |
| | FIRST COORDINATE DATA (x1,y1)<br>SECOND COORDINATE DATA (x2,y2)<br>THIRD COORDINATE DATA (x3,y3)<br>FOURTH COORDINATE DATA (x4,y4) |
| PATTERN A2 | FEED DATA (F2x0,F2y0) |
| | FIRST COORDINATE DATA (x1,y1)<br>SECOND COORDINATE DATA (x2,y2)<br>THIRD COORDINATE DATA (x3,y3)<br>FOURTH COORDINATE DATA (x4,y4) |
| | FEED DATA (F3x0,F3y0) |
| PATTERN A80 | FIRST COORDINATE DATA (x1,y1)<br>SECOND COORDINATE DATA (x2,y2)<br>THIRD COORDINATE DATA (x3,y3)<br>FOURTH COORDINATE DATA (x4,y4) |
| | END CODE |

FIG. 5

|  |  | SPEED DATA (Vx,Vy) |
|---|---|---|
| DURING FEED |  | HIGH |
| DURING CUTTING | PAPER | MIDDLE |
|  | FELT | LOW |
|  | ⋮ | ⋮ |

CUTTING APPARATUS AND NON-TRANSITORY COMPUTER-READABLE MEDIUM

CROSS-REFERENCE TO RELATED APPLICATIONS

This application is based upon and claims the benefit of priority from the prior Japanese Patent Application No. 2013-156685 filed on Jul. 29, 2013, the entire contents of which are incorporated herein by reference.

BACKGROUND

1. Technical Field

The present disclosure relates to a cutting apparatus cutting a pattern out of an object and a non-transitory computer-readable medium.

2. Related Art

Cutting apparatuses have been conventionally known which cut a pattern out of an object. One of the cutting apparatuses is configured to perform automatic cutting of a sheet serving as the object, such as paper, based on cutting data on which a pattern is cut. The sheet is attached to a holding sheet having an adhesive layer on a surface. The cutting apparatus then moves the holding sheet in a first direction and a cutting blade in a second direction perpendicular to the first direction, thereby cutting a desired pattern out of the sheet.

One type of cutting apparatus changes existing cutting data to perform cutting, in order to shorten a pattern cutting time length. More specifically, when a plurality of patterns having the same configuration is to be cut, the patterns are arranged so as to lie next to each other so that at least parts of cutting lines of the patterns are in touch with each other, and cutting data is generated in which the cutting lines are connected so that the cutting lines of the patterns are connected together or commonalized. The cutting apparatus cuts a plurality of patterns continuously with the result that a cutting time length can be shortened as compared with the case where a plurality of patterns are cut in sequence.

SUMMARY

The above-described conventional cutting apparatus can reduce a cutting time length required to cut a plurality of patterns as described above. However, the cutting time length is unknown to a user before the cutting of the patterns starts, with the result that the conventional cutting apparatus is inconvenient. Further, a remaining time length of the cutting operation is also unknown to the user during the cutting operation. This results in further inconvenience.

Therefore, an object of the disclosure is to provide a cutting apparatus which can display a cutting time length required to cut a pattern and a non-transitory computer-readable medium storing a program for the cutting apparatus.

The disclosure provides a cutting apparatus cutting a pattern out of an object. The apparatus includes a platen configured to receive the object, a cutting device having a cutter configured to cut the pattern out of the object, a first moving mechanism configured to move the cutter so that the cutter comes close to or departs from the platen, and a second moving mechanism configured to move the object and the cutter on the platen in a first direction and a second direction intersecting the first direction relative to each other. In the apparatus, the pattern is cut out of the object by the cutter moved relative to the object. The apparatus further includes a display unit configured to display at least information about cutting of the pattern and a control device. The control device is configured to cause the apparatus to obtain lengths of line segments composing a cutting line of the pattern for every line segment, based on cutting data for cutting the pattern, to calculate a time length required to cut each line segment, based on the obtained lengths of the respective line segments and a speed of the relative movement by the second moving mechanism, to calculate a cutting time length required to cut the pattern by accumulating the time lengths required to cut the respective line segments, and to cause the display unit to display a calculated cutting time length required to cut the pattern.

The disclosure also provides a non-transitory computer-readable medium storing a program for a cutting apparatus. The apparatus includes a platen configured to receive the object, a cutting device having a cutter configured to cut the pattern out of the object, a first moving mechanism configured to move the cutter so that the cutter comes close to or departs from the platen, a second moving mechanism configured to move the object and the cutter on the platen in a first direction and a second direction intersecting the first direction relative to each other, wherein the pattern is cut out of the object by the cutter moved relative to the object, a display unit configured to display at least information about cutting of the pattern, and a control device configured to execute the program. The program comprises instructions for obtaining lengths of line segments composing a cutting line of the pattern for every line segment, based on cutting data for cutting the pattern, calculating a time length required to cut each line segment, based on the obtained lengths of the respective line segments and a speed of the relative movement by the second moving mechanism, calculating a cutting time length required to cut the pattern by accumulating the time lengths required to cut the respective line segments, and causing the display unit to display a calculated cutting time length required to cut the pattern.

BRIEF DESCRIPTION OF THE DRAWINGS

In the accompanying drawings:

FIG. 5 shows data structure of cutting data;

DETAILED DESCRIPTION

Figure 1:
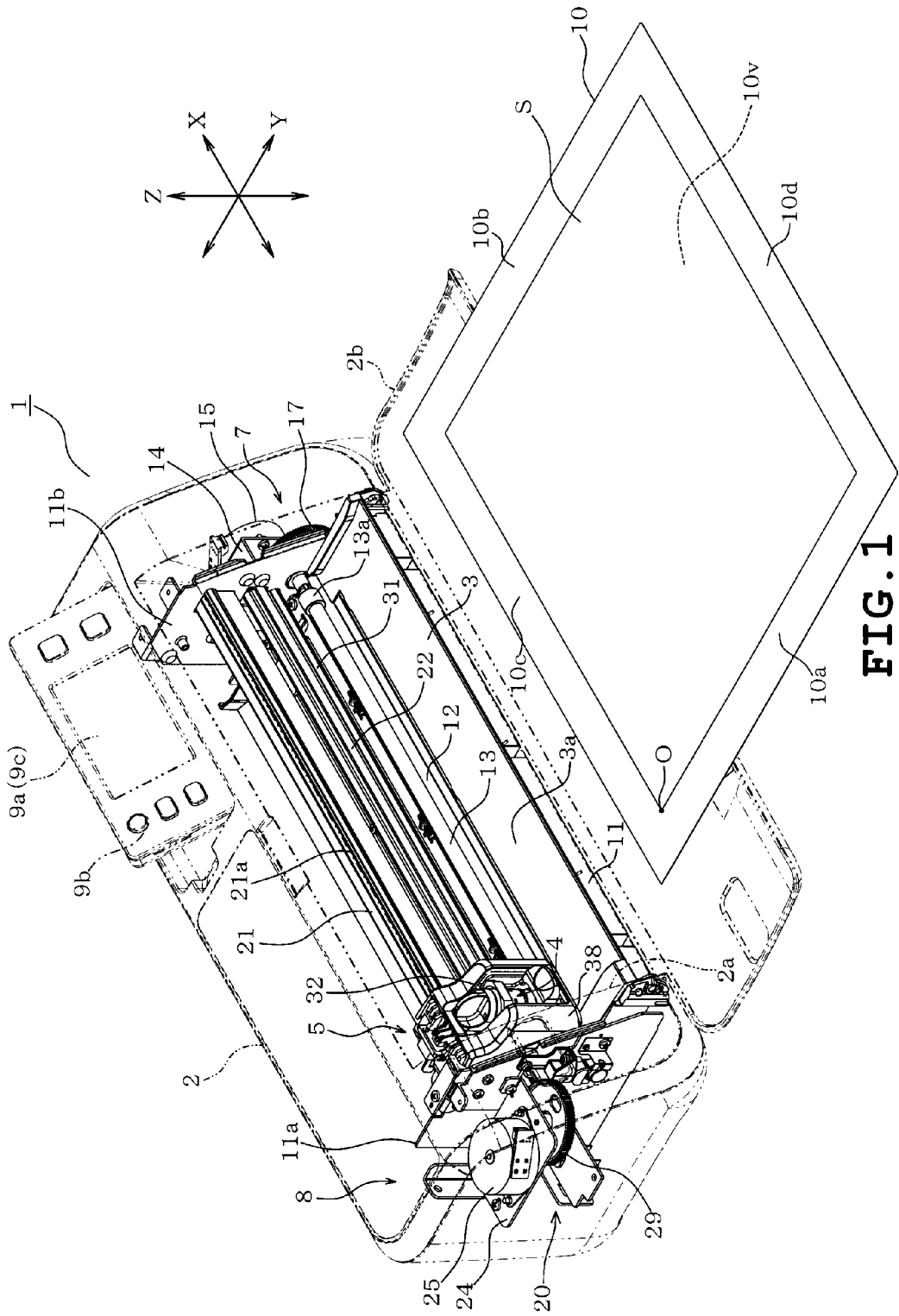
FIG. 1 is a perspective view of a cutting apparatus according to a first embodiment, showing an overall structure thereof.

An embodiment will be described with reference to FIGS. 1 to 14. Referring to FIG. 1, a cutting apparatus 1 is shown and includes a body cover 2 serving as a housing, a platen 3 provided in the body cover 2 and a cutting head 5 on which a cutter cartridge 4 is to be mounted. The cutting apparatus 1 further includes a holding sheet 10 for holding an object S to be processed.

The body cover 2 is formed into the shape of a horizontally long rectangular box. The body cover 2 has a front formed with a front opening 2a. A front cover 2b is mounted on the front of the body cover 2 to open and close the front opening 2a. The holding sheet 10 holding the object S is set onto the platen 3 while the front opening 2a is open, or the cartridge 4 is attached to or detached from a cartridge holder 32.

The cutting apparatus 1 is provided with a transfer mechanism 7 and a bead moving mechanism 8. The transfer mechanism 7 transfers the holding sheet 10 set on the platen 3 in a predetermined transfer direction (the Y direction). The head moving mechanism 8 moves the cutting bead 5 in a direction intersecting with the transfer direction of the holding sheet 10 (for example, the X direction perpendicular to the transfer direction). In the following description, the direction in which the holding sheet 10 is transferred by the transfer mechanism 7 will be referred to as "front-back direction". That is, the front-back direction is the Y direction and the right-left direction perpendicular to the Y direction is the X direction.

A liquid-crystal color display 9a and an operation device 9b including various operation switches are mounted on a right upper surface of the body cover 2. The display 9a is capable of full color display and is configured to display information about various patterns, messages necessary to the user, and the like. A touch panel 9c (see FIG. 4) is placed on a display surface side of the display 9a. The operation device 9b or the touch panel 9c is operable for selection of a pattern displayed on the display 9a, selection of various processing modes, the setting and input of various parameters, and the like. A pattern designating unit is comprised of the display device 9a, the operation device 9b and the touch panel 9c together with a control circuit 61 which will be described later.

Figure 2:
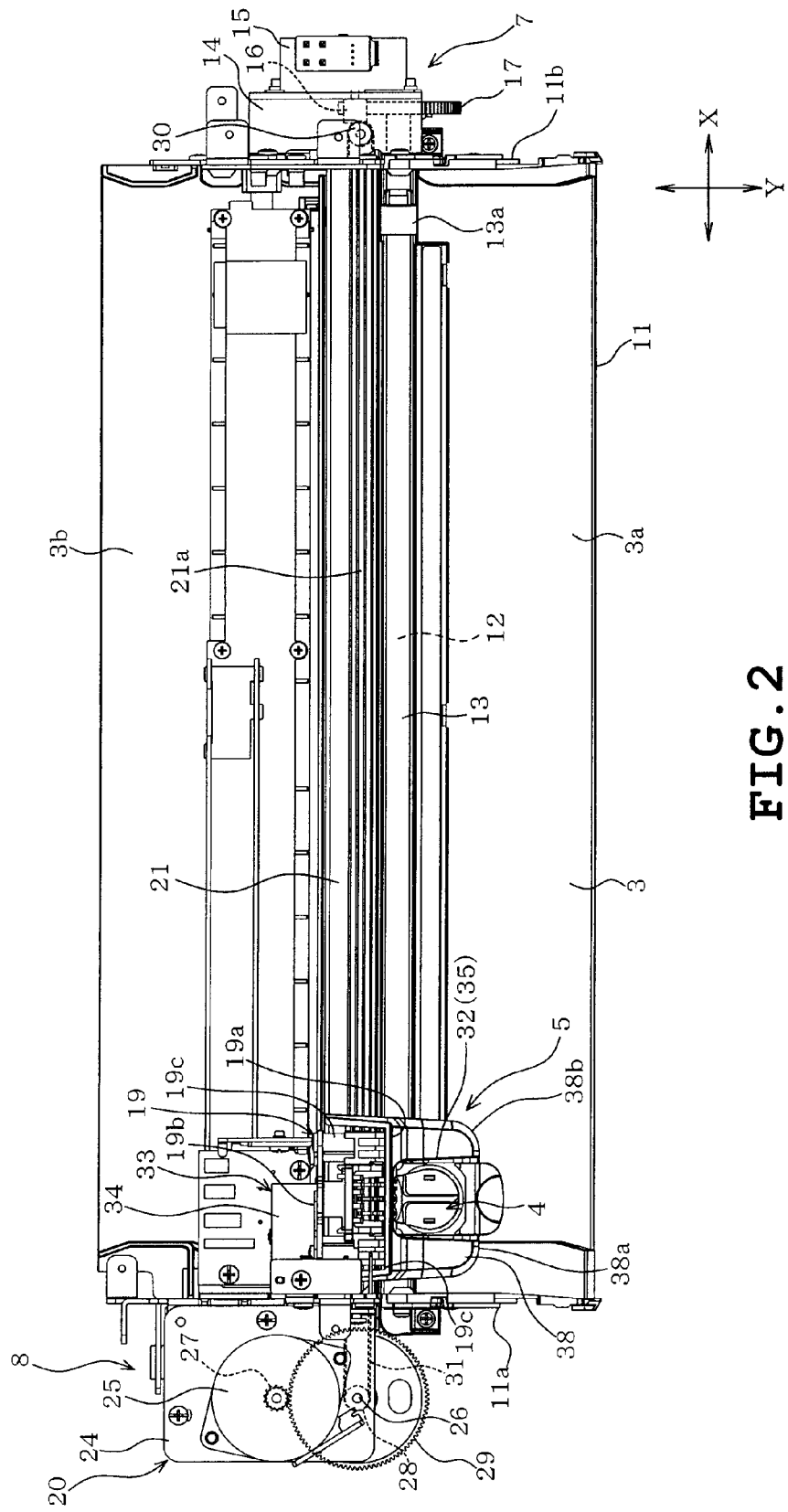
FIG. 2 is a plan view of the cutting apparatus, showing an inner structure thereof.

The platen 3 receives the underside of the holding sheet 10 when the object S is cut. The platen 3 includes a front platen 3a and a rear platen 3b and has a horizontal upper surface as shown in FIG. 2. The holding sheet 10 holding the object S is transferred while being placed on the platen 3. The holding sheet 10 is made of a synthetic resin material, for example and formed into a rectangular shape. An adhesive layer 10v (see FIG. 1) is formed on an upper side of the holding sheet 10. The adhesive layer 10v is formed by applying an adhesive agent to an inner region of the holding sheet 10 except for peripheral edges 10a to 10d. The object S is attached to the adhesive layer 10v thereby to be held on the holding sheet 10. The adhesive layer 10v has an adhesive force which is set so that the object S is immovably held reliably in the cutting process by the use of a cutter 6 of the cutter cartridge 4 and so that the object S can be easily removed after the cutting. The transfer mechanism 7 and the head moving mechanism 8 are constructed into a moving device 20 which moves the holding sheet 10 holding the object S in the X direction and the cutting head 5 in the Y direction relative to each ether.

The transfer mechanism 7 transfers the holding sheet 10 on the upper surface side of the platen 3 freely in the Y direction as the first direction. A frame 11 is enclosed in the body cover 2 as shown in FIGS. 1 and 2. The frame 11 includes right and left sidewalls 11b and 11a which are located at right and left sides of the platen 3 so as to face each other, respectively. A driving roller 12 and a pinch roller 13 are mounted on both sidewalls 11a and 11b so as to be located in a space between the front and rear platens 3a and 3b. The driving roller 12 and the pinch roller 13 extend in the right-left direction and lined in the up-down direction. The pinch roller 13 is located above the driving roller 12.

The driving roller 12 has an upper end which is substantially level with the upper surface of the platen 3 and right and left ends mounted on the right and left sidewalls 11b and 11a respectively so that the driving roller 12 is rotatable. The right end of the driving roller 12 extends rightward through the right sidewall 11b as shown in FIG. 2. A driven gear 17 having a large diameter is secured to the right end of the driving roller 12. A mounting frame 14 is fixed to an outer surface of the right sidewall 11b. A Y-axis motor 15 comprised of a stepping motor, for example is mounted on the mounting frame 14. The Y-axis motor 15 has an output shaft to which is fixed a driving gear 16 having a small diameter and is to be brought into mesh engagement with the driven gear 17.

The pinch roller 13 has right and left ends mounted on the right and left sidewalls 11b and 11a respectively so that the pinch roller 13 is rotatable and slightly displaceable in the up-down direction. Two springs (not shown) are mounted on outer surfaces of the right and left sidewalls 11b and 11a to normally bias the right and left ends of the pinch roller 13 downward. Accordingly, the pinch roller 13 is normally biased downward (to the driving roller 12 side) by the springs. Two rollers 13a having slightly larger diameters are mounted on the pinch roller 13 so as to be located near both ends thereof, respectively. Only the right roller 13a is shown in FIGS. 1 and 2.

The holding sheet 10 has right and left edges 10b and 10a held between the driving roller 12 and the rollers 13a of the pinch roller 13. Upon normal or reverse rotation of the Y-axis motor 15, the rotation is transmitted via the gears 16 and 17 to the driving roller 12, whereby the holding sheet 10 is transferred rearward or forward. The transfer mechanism 7 is thus comprised of the driving roller 12, the pinch roller 13, the Y-axis motor 15 and the gears 16 and 17 serving as a reduction mechanism.

The head moving mechanism 8 serves to move a carriage 19 of the cutting head 5 freely in the X direction as the second direction. A pair of guide rails 21 and 22 are fixed to the right and left side walls 11b and 11a so as to be located slightly rear above the pinch roller 13, as shown in FIGS. 1 and 2. The guide rails 21 and 22 extend in the right-left direction substantially in parallel to the pinch roller 13. Guide grooves are formed in an upper surface of the guide rail 21 and an underside of the guide rail 22 so as to extend between the right and left ends although only the guide groove 21a of the upper surface is shown.

Furthermore, the carriage 19 has a pair of protrusions engaging the guide grooves 21a respectively although the guide grooves are not shown. The protrusions are formed on the upper and lower sides so as to hold the guide grooves 21a therebetween in the up-down direction. Thus, the carriage 19 is supported by the engagement of the protrusions and the guide grooves 21a so as to be slidable on the guide rails 21 and 22 in the right-left direction.

A horizontal mounting frame 24 is fixed to the outer surface of the left sidewall 11a so as to be located near the rear of the left sidewall 11a at the outer surface side, as shown in FIGS. 1 and 2. An X-axis motor 25 is mounted on the mounting frame 24 to a downward direction. Furthermore, a vertically extending pulley shaft 26 (see FIG. 2) is mounted on the mounting frame 24 so as to be located in front of the X-axis motor 25. The X-axis motor 25 is comprised of a stepping motor, for example and has an output shaft to which a driving gear 27 having a small diameter is fixed. A timing pulley 28 and a driven gear 29 having a large diameter are rotatably mounted on the pulley shaft 26. The driven gear 29 is brought into mesh engagement with the driving gear 27. The timing pulley 28 and the driven gear 29 are configured to be rotated together.

On the other hand, a timing pulley 30 is mounted on the right mounting frame 14 so as to be rotatable about an axis extending in the up-down direction. An endless timing belt 31 horizontally extends between the timing pulleys 30 and 28 in the right-left direction. The timing belt 31 has a midway part joined to a mounting part (not shown) of the carriage 19.

Upon normal or reverse rotation of the X-axis motor 25, the rotation is transmitted via the gears 27 and 29 and the timing pulley 28 to the timing belt 31, whereby the cutting head 5 is moved leftward or rightward. Thus, the carriage 19 is moved in the right-left direction perpendicular to the direction in which the object S is transferred. The head moving mechanism 8 thus includes the guide rails 21 and 22, the X-axis motor 25, the gears 27 and 29 serving as a reduction mechanism, the timing pulleys 28 and 30, the timing belt 31 and the like.

Figure 3A:
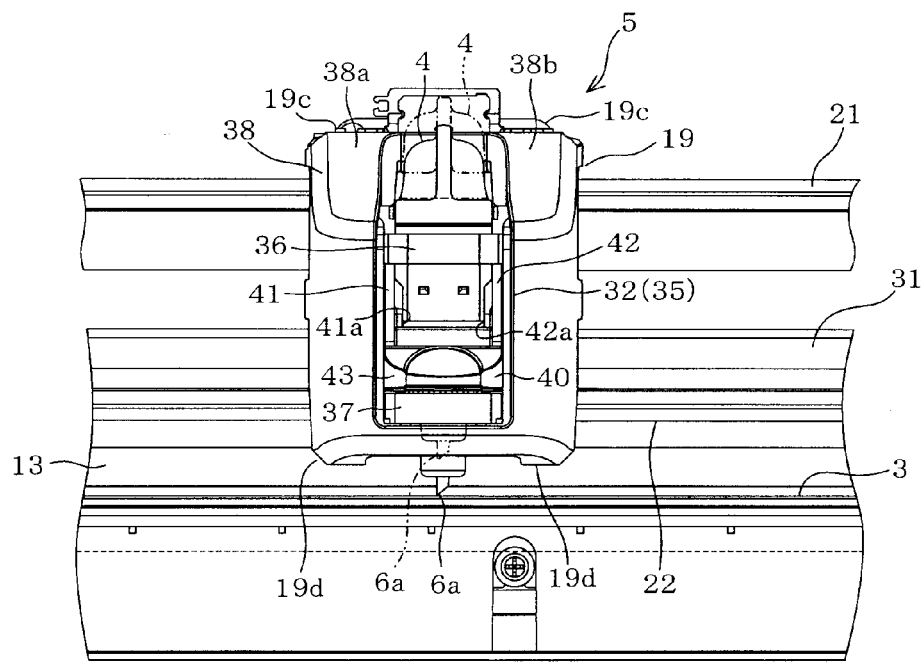
FIGS. 3A and 3B are front views showing a cutting head and its vicinity, and a cutter cartridge respectively.

The cutting head 5 includes an up-down drive mechanism 33 and a cartridge holder 32 disposed in the rear and in front of the carriage 19 as shown in FIG. 2. The up-down drive mechanism 33 is configured to drive the cartridge holder 32 in the up-down direction (the S direction) together with the cartridge 4. The carriage 19 includes front and rear walls 19a and 19b and upper and lower arms 19c and 19d connecting the walls 19a and 19b, as shown in FIGS. 2 and 3A. Thus, the carriage 19 is formed to surround the front and rear sides and upper and lower sides of the guide rails 21 and 22. A Z-axis motor 34 (see FIG. 2) is mounted on the rear wall 19b of the carriage 19 so that an axis thereof is directed frontward. The Z-axis motor 34 is comprised of a stepping motor, for example. A transmission mechanism (not shown) is provided between the Z-axis motor 34 and the cartridge holder 32. The transmission mechanism reduces a rotational speed of the Z-axis motor 34 and converts rotation of the Z-axis motor 34 to up-down movement of the cartridge holder 32, transmitting the up-down movement. The up-down drive mechanism 33 thus includes the transmitting mechanism and the Z-axis motor 34.

Figure 3B:
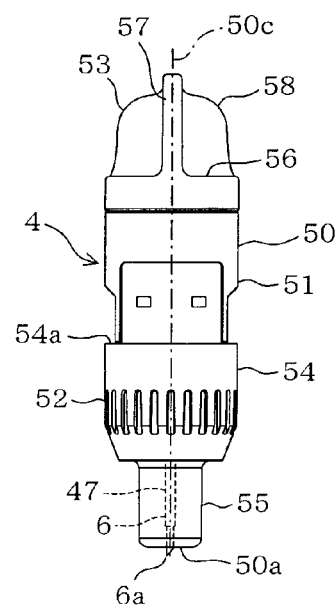

Upon normal or reverse rotation of the Z-axis motor 34, the rotation is converted via the transmission mechanism to the up-down movement, whereby the cartridge holder 32 is moved upward or downward together with the cutter cartridge 4. As a result, the cartridge holder 32 is moved together with the cutter cartridge 4 between a lowered position and a raised position (see two-dot chain line in FIG. 3A). When the cutter cartridge 4 of the cartridge holder 32 is located at the lowered position, cutting is carried out by a blade edge 6a of a cutter 6 as shown in FIG. 3B. When the cutter cartridge 4 of the cartridge holder 32 is located at the raised position, the blade edge 6a of the cutter 6 is spaced away from the object S by a predetermined distance.

When the cutter cartridge 4 is attached to the cartridge holder 32 and is located at the lowered position, the blade edge 6a penetrates the object S. Pressure of the blade edge 6a in this state will be set to be suitable for the cutting based on an amount of rotation of the Z-axis motor 34. The pressure will hereinafter be referred to as "cutter pressure."

The cartridge holder 32 includes a holder frame 35 driven up and down by the up-down drive mechanism 33 and upper and lower holders 36 and 37 both fixed to the holder frame 35 as shown in FIGS. 2 and 3A. More specifically, a cover member 38 is mounted on the front wall 19a of the carriage 19 to cover right and left sides of the front wall 19a from front. The holder frame 35 serving as a movable part is disposed between a left projection 38a and a right projection 38b of the cover member 38. The holder frame 35 is formed to have a top, underside and front all of which are open as shown in FIG. 2. The upper and lower holders 36 and 37 are attached so that the cartridge 4 is inserted through the both holders 36 and 37 from above. The upper and lower holders 36 and 37 are each formed into a frame shape such that the holders 36 and 37 are housed in the holder frame 35.

The holder frame 35 is provided with a lever member 40 located between the upper and lower holders 36 and 37 as shown in FIG. 3A. The lever member 40 has a pair of right and left arms 42 and 41 and an operating portion 43 which is provided to connect between distal end sides of the arms 41 and 42. The lever member 40 is swingably mounted on the holder frame 35 while having a proximal end located at the side of upper ends of the arms 41 and 42. The arms 41 and 42 include inner surface sides provided with small columnar engagement portions 41a and 42a respectively. The engagement portions 41a and 42a are formed to be engageable with engaged portions 54a of the cutter cartridge 4 respectively.

As a result, the lever member 40 is swung about the proximal ends of the arms 41 and 42 so as to be switchable between a fixed position shown in FIG. 3A and an open position at which the operating portion 43 is pulled frontward so that the lever member 40 is swung. As shown in FIG. 3A, the engagement portions 41a and 42a engage engaged portions 54a respectively when the lever member 40 is located at the fixed position. As the result of the engagement, the cutter cartridge 4 is fixed to the lower holder 37 (the cartridge holder 32). On the other hand, when operated so as to be pulled frontward, the lever member 40 is swung from the fixed position to the open position. With this swing, the engagement portions 41a and 42a depart from the respective engaged portions 54a, whereby the lever member 40 is released from the fixed state. Thus, the cutter cartridge 4 can be detachably attached to the cartridge holder 32 easily and reliably by operating the lever member 40.

A plurality of cutter cartridges 4 detachably attached to the cartridge holder 32 is prepared for the cutting apparatus 1 of the embodiment. The cutter 6 is replaceable together with the cartridge 4. The cutter cartridge 4 will now be described with reference to FIG. 3B. The cutter cartridge 4 has a case 50 including a case body 51, a cap 52 and a knob 53. The cap 52 and the knob 53 are mounted on one end and the other end of the case body 51 respectively. The case body 51 is formed into a cylindrical shape and extends in the up-down direction. The cap 52 includes a larger-diameter portion 54 and a smaller-diameter portion 55. The larger-diameter portion 54 is fitted with a lower end of the case body 51. The larger-diameter portion 54 has an upper end serving as an engaged portion 54a which abuts on the engagement portions 41a and 42a of the lever member 40. The larger-diameter portion 54 has a lower end which is fitted with the lower holder 37 of the cartridge holder 32. The cap 52 has an underside 50a formed into a flat shape. The underside 50a has a through hole (not shown) through which the blade edge 6a of the cutter 6 is inserted. The knob 53 has a cover plate 56, a knob plate 57 and a rear plate 58 all of which are formed integrally therewith. The cover plate 56 is fixed to an upper part of the case body 51. The knob plate 57 and the rear plate 58 are provided on an upper part of the cover plate 56. The knob plate 57 is mounted on a central part of the cover plate 56 in the right-left direction so as to be directed vertically.

The cutter cartridge 4 includes the cutter 6 having a proximal end serving as a cutter shaft 47 and a distal end (a lower end) serving as the blade edge 6a, both of which are formed integrally with the cutter 6. The cutter shaft 47 is formed into a round bar shape and is housed in the case 50. The blade of the cutter 6 is generally formed into a V-shape tilted relative to the object S although not shown in detail in the drawings. Furthermore, bearings (not shown) are provided in the case body 51 to support the cutter shaft 47 so that the cutter shaft 47 is rotatable about a central axis 50c thereof. The blade edge 6a protrudes from the underside 50a of the cap 52.

In cutting the object S, a control circuit 61 causes the up-down drive mechanism 33 to move the cutter cartridge 4 attached to the cartridge holder 32 to the lowered position and set the cutter cartridge 4 to the above-described cutter pressure. In this case, the blade edge 6a penetrates through the object S on the holding sheet 10 and further slightly into the holding sheet 10. In this state, the holding sheet 10 and the cutter cartridge 4 (the cutter 6) are moved in the X and Y directions relative to each other by the transfer mechanism 7 and the head moving mechanism 8 respectively, so that the cutting of the object S is executed. An X-Y coordinate system is set in the cutting apparatus 1 with, for example, a left corner of adhesive layer 10v serving as the origin O of the holding sheet 10 as shown in FIG. 1. The holding sheet 10 (the object S) and the cutting head 5 (the cutter 6) are moved relative to each other based on the X-Y coordinate system.

Figure 4:
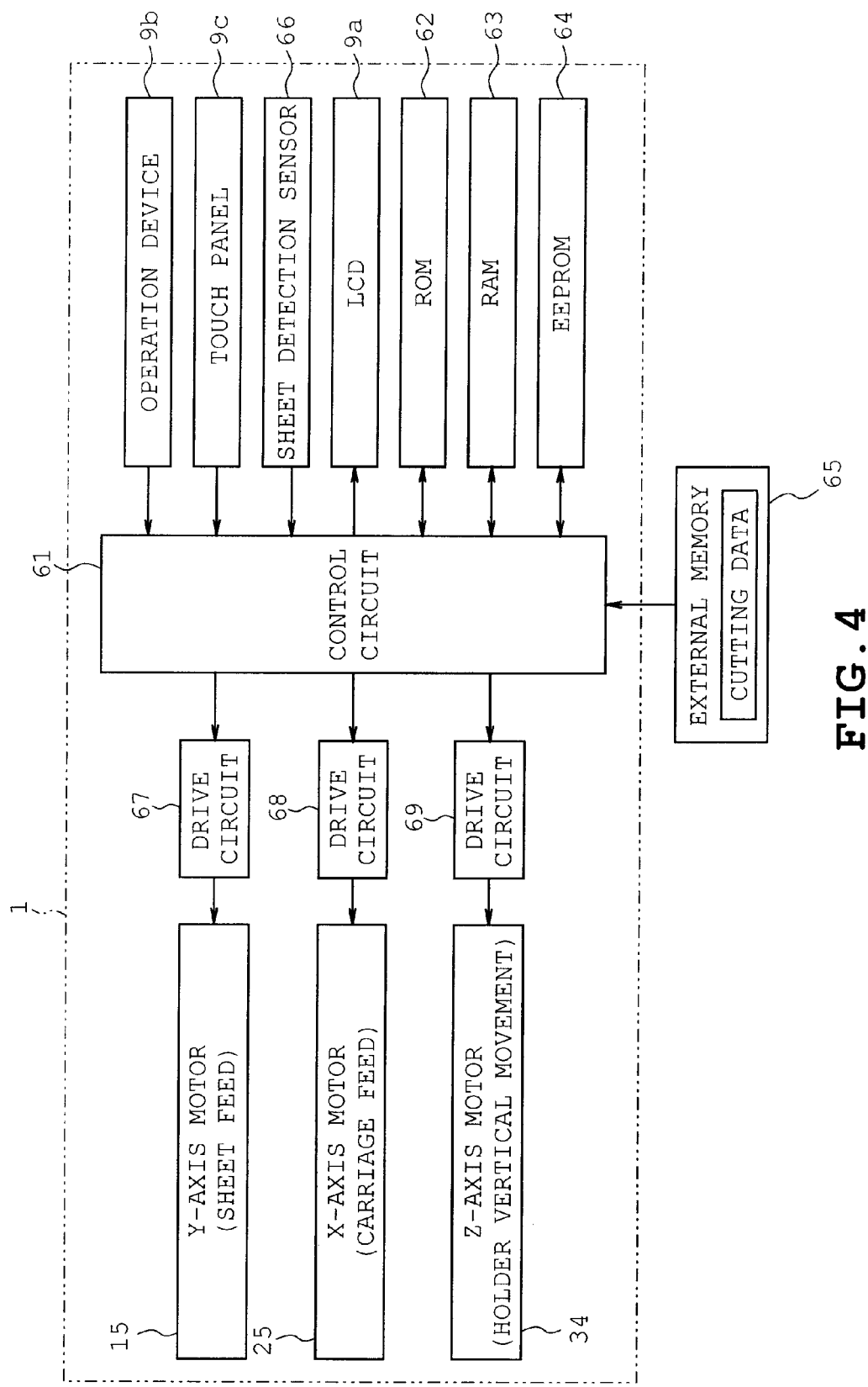
FIG. 4 is a block diagram showing an electrical arrangement of the cutting apparatus.

The configuration of the control of the cutting apparatus 1 will be described with reference to FIG. 4. The control circuit 61 controlling the whole cutting apparatus 1 is mainly composed of a computer (CPU). The control circuit 61 is connected to a ROM 62, a RAH 63, an EEPROM 64 and an external memory 65. The ROM 62 stores a cutting control program for controlling a cutting operation, a display control program for controlling display by the display 9a, a processing program which will be described later, and the like. Each of the ROM 62 and the external memory 65 is configured as a storage unit for storing cutting data for cutting a plurality of types of patterns.

Signals generated by a sheet detection sensor 66 and various operation switches are supplied to the control circuit 61. The control circuit 61 is further connected to the display 9a and the touch panel 9c. While viewing the contents displayed on the display 9a, the user operates one or more operation switches of the operation device 9b or the touch panel 9c, so that the user can select a desired pattern or set various processing modes and parameters. The control circuit 61 is still further connected to drive circuits 67, 68 and 69 driving the Y-axis motor 15, the X-axis motor 25, the Z-axis motor 34 respectively. The control circuit 61 controls the Y-axis motor 15, the X-axis motor 25, the Z-axis motor 34 and the like based on the cutting data, thereby causing the cutting apparatus 1 to execute a cutting operation for the object S placed on the holding sheet 10.

The cutting data will now be described with an example in which a plurality of patterns is cut out of the object S held on the holding sheet 10. As exemplified in FIG. 6A, patterns A1 to A80 each of which is formed into the shape of a square are to be cut. The patterns A1 to S80 are arranged in ten rows and eight columns.

Full data (cutting data) in this case includes "pattern number n" indicative of information about a total number of patterns, "pattern A1" to "pattern A80" indicative of cutting line data, display data and the like, as shown in FIG. 5. The total number of patterns or "pattern number n" is 80. Cutting line data is data of coordinate values indicative of X-Y coordinates of apexes of a cutting line composed of a plurality of line segments and is defined by the X-Y coordinate system of the cutting apparatus 1.

Figure 7A:
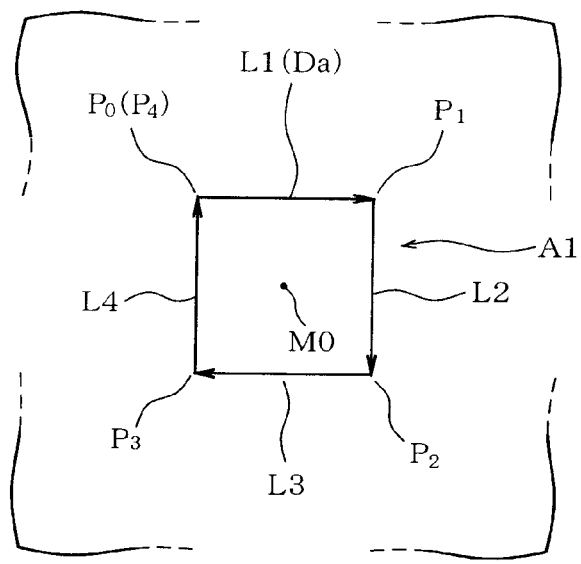
FIGS. 7A and 7B are enlarged views of ones of the patterns as shown in FIGS. 6A and 6B, respectively.

More specifically, as shown in an enlarged form in FIG. 7A, the cutting line of pattern A1 includes four line segments L1 to L4 and is formed into a closed square having a cutting start point $P_0$ and a cutting end point $P_4$ corresponding with each other. The cutting line data of pattern A1 includes feed data (F1$x$0, F1$y$0), first coordinate data (x1, y1), second coordinate data (x2, y2), third coordinate cats (x3, y3) and fourth coordinate data (x4, y4) corresponding to cutting start point $P_0$, apex $P_1$, apex $P_2$, apex $P_3$ and cutting end point $P_4$ respectively. The feed data is provided to move the cutter 6 to cutting start point $P_0$ in starting the cutting of pattern A1. In other words, the cutting head 5 is moved to the cutting start point $P_0$ at the time of feed without cutting and the cutter 6 is moved up and down, based on the feed data.

The other patterns A2 to A80 are the same square as the pattern A1. Each of the patterns A2 to A80 also includes line segments L1 to L4 as the pattern A1. Coordinate values (first coordinate data to fourth coordinate data) of patterns A1 to A80 are set so that the patterns A1 to A80 are formed to be spaced from one another. An end code is suffixed to the full data.

The control circuit 61 is configured as a cutting control unit which causes the cutting apparatus 1 to execute the cutting of pattern A1 to pattern A80 in sequence, based on the full data. More specifically, the cutter 6 is moved to the X-Y coordinates of cutting start point $P_0$ by the transfer mechanism 7 and the head moving mechanism 8. The blade edge 6a of the cutter 6 is then caused to penetrate through the cutting start point $P_0$ of the object S by the up-down drive mechanism 33. The blade edge 6a is then moved relatively toward the coordinates of the end point P1 of the line segment L1 by the transfer mechanism 7 and the head moving mechanism 8, whereby the object S is cut along the line segment L1. Regarding next line segment L2, cutting is executed with the end point P1 of the previous line segment L1 serving as a start point in the same manner as the line segment L1. Regarding line segments L2 to L4, the cutter 6 is relatively moved so that the pattern A1, namely, the cutting line of "square" is cut.

Regarding the other patterns A2 to A80, too, the cutting line of pattern A2, the cutting line of pattern A3, . . . and the cutting line of pattern A80 are cut in this sequence based on the cutting line data in the same manner as described above. In this case, the blade edge 6a of the cutter 6 is spaced from the object S by the up-down drive mechanism 33 to be moved to a position corresponding to a next cutting start point $P_O$ every time the cutting line of each of the patterns A1 to A79 is cut, based on the initial "feed data" of the cutting line data of each of the patterns A2 to A80. When the cutting line of pattern A80 has been cut, the blade edge 6a of the cutter 6, which is spaced from the object S, is moved to the origin O which is a stand-by position of the carriage 19, based on the end code.

The user has little work to do during the cutting operation of the cutting apparatus 1 but wait for completion of the cutting. Accordingly, the user can do another work in this period or leave the cutting apparatus 1 and return when the cutting operation is completed. In these cases, it is convenient for the user to get information about a time length required for completion of the cutting of the patterns A1 to A80.

In view of the above-described conditions, the control circuit 61 in the embodiment is configured as a display control unit which causes the display 9a to display a cutting time length required for the cutting of patterns. A screen 100 displaying the cutting time length will be described with reference to FIG. 9. The time length display screen 100 includes two pattern display areas 70a and 70b, two cutting time length display areas 71a and 71b. A pattern designated by the user is displayed on the pattern display areas 70a and 70b. A cutting time length required to cut the pattern is displayed on the cutting time length display areas 71a and 71b. When the patterns A1 to A80 are designated by the user, the pattern A1 to be initially cut is displayed on the pattern display area 70a, for example. Further, when a cutting time length reducing process which will be described later is to be executed, the pattern with a changed arrangement angle is displayed on the pattern display area 70b. A cutting time length and a total cutting time length are displayed on the cutting time length display areas 71a and 71b in correspondence with the patterns on the pattern display areas 70a and 70b, respectively.

The control circuit 61 measures, as a timer/counter, an elapsed time length beginning at start of the cutting operation and calculates a remaining time length terminating with end of the cutting operation (cutting end), by subtracting the elapsed time length from the cutting time length. As a result, countdown of the cutting time length of each of the patterns A1 to A80 and countdown of the total cutting time length of the patterns A1 to A80 are displayed from the cutting start. In other words, a remaining time length of each of the patterns A1 to A80 is displayed on the cutting time length display area 71a, and a total remaining time length of the patterns A1 to A80 is displayed on the cutting time length display area 71b.

Figure 6B:
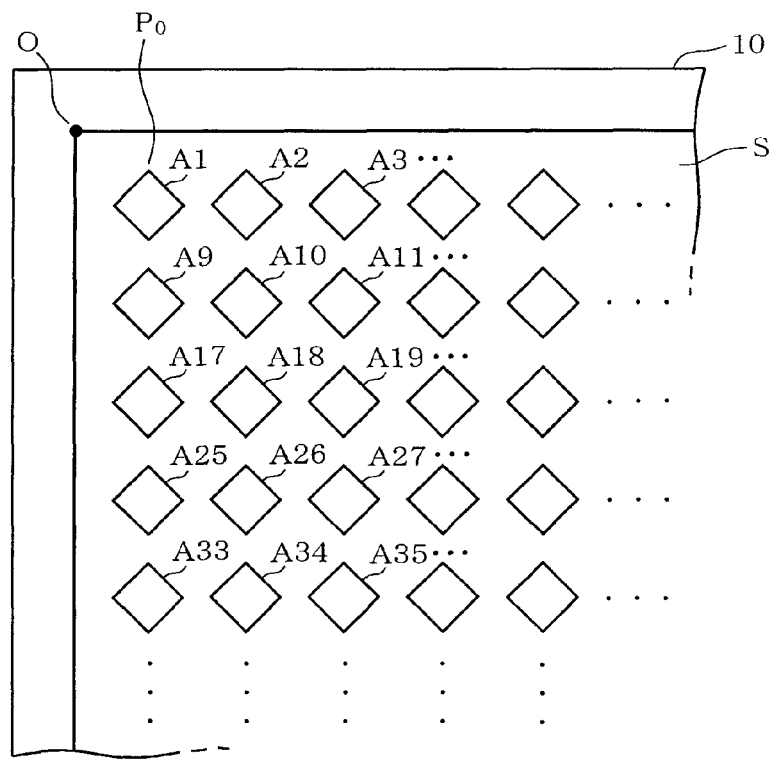
Figure 7B:
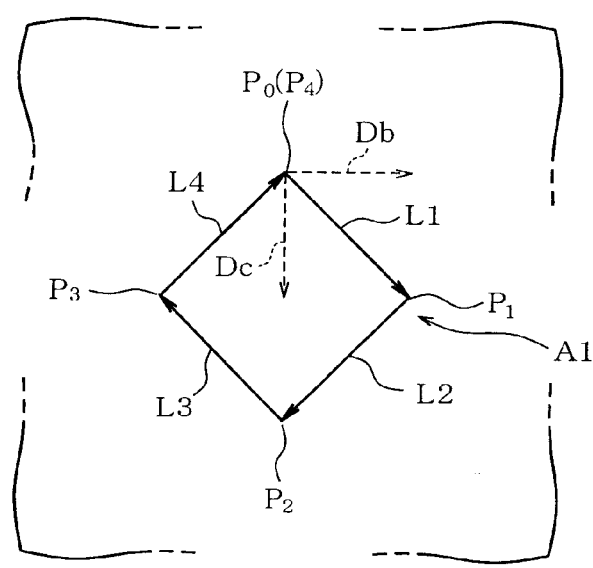

Further, in the cutting apparatus 1 of the embodiment, an arrangement angle of each pattern at which a cutting time length is rendered shortest is calculated by the software configuration, based on the above-described existent cutting data (full data). More specifically, in the cutting apparatus 1, new cutting data in which arrangement angles of the patterns A1 to A80 have been changed is generated as shown in FIGS. 6B and 7B. An arrangement angle of a pattern denotes a rotation angle in the case where the pattern is rotated about a predetermined rotation center within an X-Y plane parallel to the X direction and the Y direction, for example. More specifically, the arrangement angle of the pattern A1 relative to the X direction (or the Y direction) is determined by the control circuit 61 to be an angle at which a cutting time length (a first cutting time length) becomes shortest when the pattern A1 is rotated about a center point $M_O$ (see FIG. 7A) by a first unit angle θ1. This processing will be described in detail later. The arrangement angle of the pattern A1 is determined to be 45° at which the line segments L1 to L4 of the pattern A1 are tilted relative to the X direction and the Y direction (see FIG. 7B). Cutting line data of the patterns A1 to A80 is converted based on the determined arrangement angle.

A cutting time length of a pattern is calculated from distances of line segments composing the a cutting line, a moving speed Vx of the carriage 19 of the cutting head 5 and a transfer speed Vy of the object S. The moving speed Vx in the X direction and the transfer speed Vy in the Y direction are corrected according to the conditions in the cutting. More specifically, as exemplified in FIG. 8, speed data Vx for the X direction and speed data Vy for the Y direction are set at high speed in the feeding. The speed data Vx and Vy are set at middle speed in the cutting when the object S is paper. The speed data Vx and Vy are set at low speed in the cutting when the object S is felt cloth. Data of these conditions is stored in the ROM 62 in the form of a correcting data table. The speed data Vx and Vy are set to be optimum cutting conditions according to material properties of the object S.

Further, in the embodiment, the moving speed Vx of the carriage 19 of the cutting head 5 is assumed to be equal to the transfer speed Vy of the object S. The moving speed Vx also denotes a moving speed of the blade edge 6a of the cutter 6.

The following will describe the relationship between an arrangement angle of a pattern and a cutting time length. Symbol "Da" designates a moving distance of the blade edge 6a in the X direction in the cutting of the line segment L1 in the case of the pattern A1 having an initial value of arrangement angle set at 0°, as shown in FIG. 7A. On the other hand, symbol "Db" designates a moving distance of the blade edge 6a in the X direction in the cutting of the line segment L1 in the case of the pattern A1 with an arrangement angle being set at 45°, as shown in FIG. 7B. Symbol "Dc" designates a moving distance of the object S in the Y direction. In this case, a cutting time length of the line segment L1 depends upon whichever is longer of the moving distances in the X direction and the Y direction when the blade edge 6a is moved relative to the object S simultaneously in the X and Y directions by the transfer mechanism 7 and the head moving mechanism 8. In this regard, the moving distance Db in the X direction is equal to the moving distance Dc in the Y direction in the pattern A1 as shown in FIG. 7B. Accordingly, the cutting time length of the line segment L1 can be said to depend upon the moving distance Db in the X direction. The moving distance Da in the X direction at the arrangement angle as shown in FIG. 7A is equal to the length of the line segment L1. On the other hand, the moving distance Db in the X direction at the arrangement angle of 45° as shown in FIG. 7B is obtained by multiplying the length of line segment L1 by cosine 45° (=about 0.7). In other words, the moving distance of the blade edge 6a is shortened into the value of 0.7 times when the arrangement angle of the pattern A1 is changed from 0° to 45°. Thus, the relative moving distance of the blade edge 6a in the X or Y direction is shortened by the arrangement angle of the pattern with the result that the cutting time length is reduced accordingly. The cutting time length is calculated by the control circuit 61 based on the moving distance Da, Db or Dc and the speed data Vx or Vy.

A concrete processing procedure including control for display of the above-described cutting time length will be described with reference to FIGS. 10 to 15. FIGS. 10 to 14 are flowcharts showing a flow of the processing program executed by the control circuit 61. Steps S1 and S2 in the flowchart of FIG. 10 will be described together with acts of the user, for the sake of expedience.

Firstly, the user sets the holding sheet 10 with the object S being attached thereto onto the platen 3 of the cutting apparatus 1 (step S1). Assume now that the object S is a sheet of paper. When a sheet detection sensor 66 detects a distal end of the holding sheet 10, the control circuit 61 sets a left corner of the adhesive layer 10*v* of the holding sheet 10 to the origin O.

The user then causes the display 9*a* to display a pattern selection screen (not shown), selecting a desired pattern by a touch operation to the touch panel 9*c* (step S2). The control circuit 61 reads cutting data (full data as shown in FIG. 5, for example) of the pattern designated by the selection of the user, from cutting data stored in, for example, an external memory 65, causing a memory of the RAM 63 to store the read cutting data. Further, the user causes the display 9*a* to display a setting screen (not shown) and operates the touch panel 9*c* to set to "paper" the type of the object S set at step S1 (step S2). The setting screen displays selection items including "a time reduction mode" to reduce a cutting time length and "a normal mode." When the time length reduction mode is selected by the touch operation to the touch panel 9*c* (YES at step S3), the control circuit 61 executes a cutting time length reducing process (step S4). The normal mode will be described later.

Figure 11:
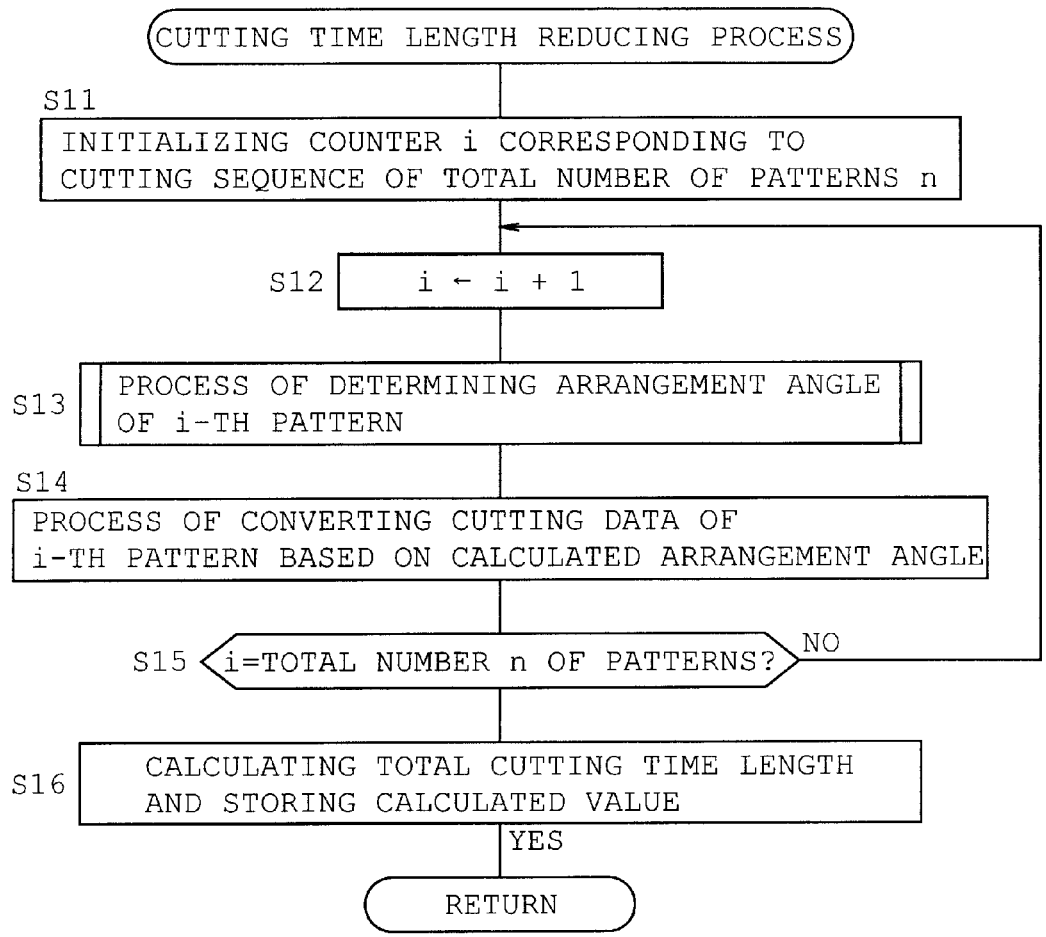
FIG. 11 is a flowchart of a cutting times length reducing process.

In the cutting time length reducing process as shown in FIG. 11, the control circuit 61 resets a counter i to 0 thereby to initialize the counter i (step S11). The counter i corresponds to a cutting sequence of the patterns A1 to A80. The control circuit 61 subsequently increments the counter i by 1 (step S12) and executes a process of obtaining an arrangement angle to render the cutting time length shortest with respect to the first pattern A1 in the cutting sequence (step S13; see FIG. 12).

In this case, the control circuit 61 resets a shortest cutting time length Tm and an arrangement angle θm of the pattern A1 and an angle counter θc to 0 for initialization. The angle counter θc represents a current arrangement angle of the pattern A1. Further, the arrangement angle (the state as shown in FIG. 7A) of the pattern A1 in the existing cutting data is set to 0. A cutting time length Tc of the pattern A1 in this case is calculated in the following manner (step S22; see FIG. 13). More specifically, the control circuit 61 initializes the cutting time length Tc to 0 and obtains coordinate data (origin O) at a standby position of the carriage 19, that is, at the current coordinate position and coordinate data of the cutting start point $P_0$ of the pattern A1, that is, a destination, at step S31 in FIG. 13. Based on the obtained coordinate data, the control circuit 61 obtains lengths D or distances from the origin O to the cutting start point $P_0$ of the pattern A1 in the X and Y directions (step S32). In this case, the coordinate data of the destination is feed data (YES at step S33; see F1*x*0 and F1*y*0 in FIG. 5). The control circuit 61 then calculates a transit time to reach the cutting start point $P_0$, based on the relative movement conditions of the cutter 6 in the feeding and the lengths in the X and Y directions obtained at step S32 (steps S35 and S36).

Figure 6A:
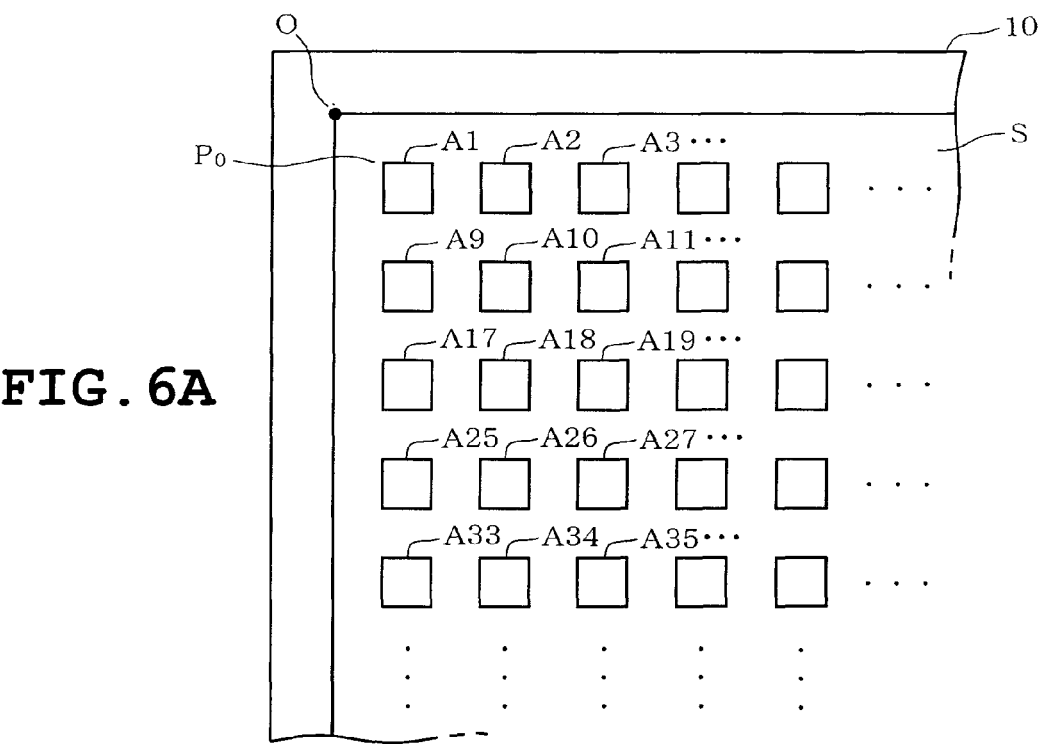
FIGS. 6A and 6B are plan views of a group of square patterns to be cut out of an object, showing the pattern group before and after change in an arrangement angle respectively.
Figures 8, 9:
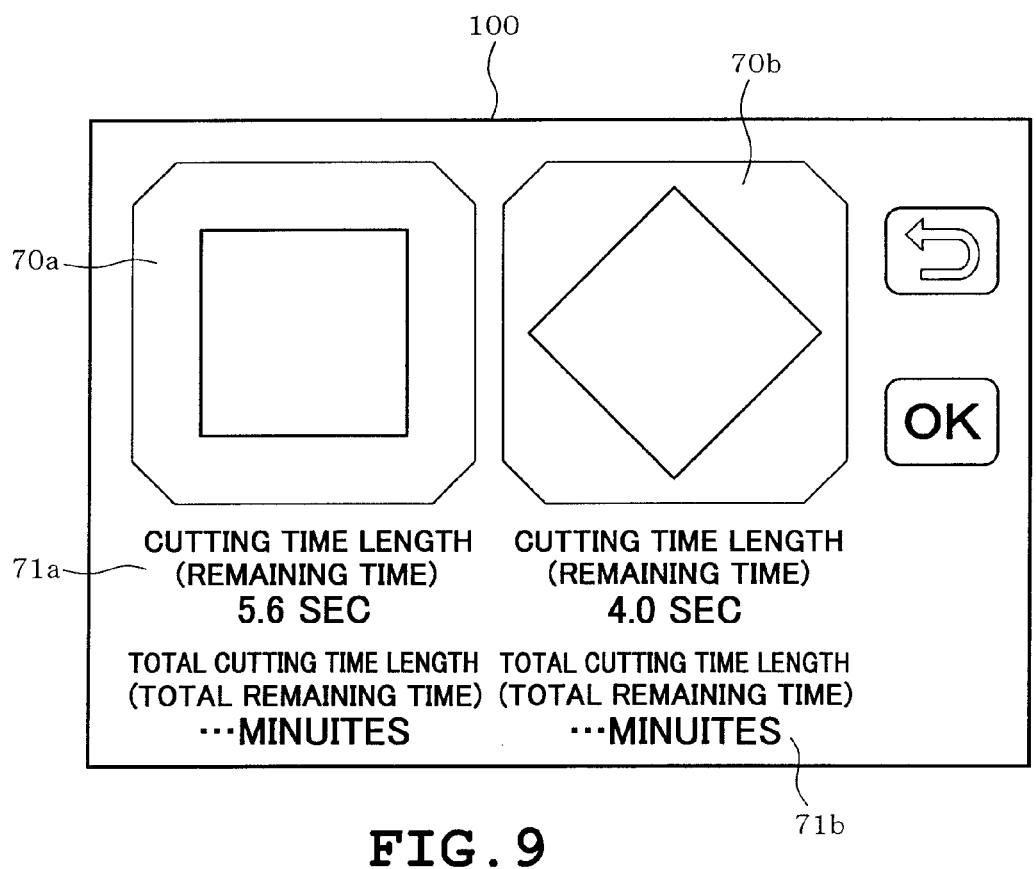
FIG. 8 shows types of objects correlated to set speeds of a moving device.
FIG. 9 shows a screen displaying the pattern before change and the pattern after change together with respective cutting time lengths.
Figure 10:
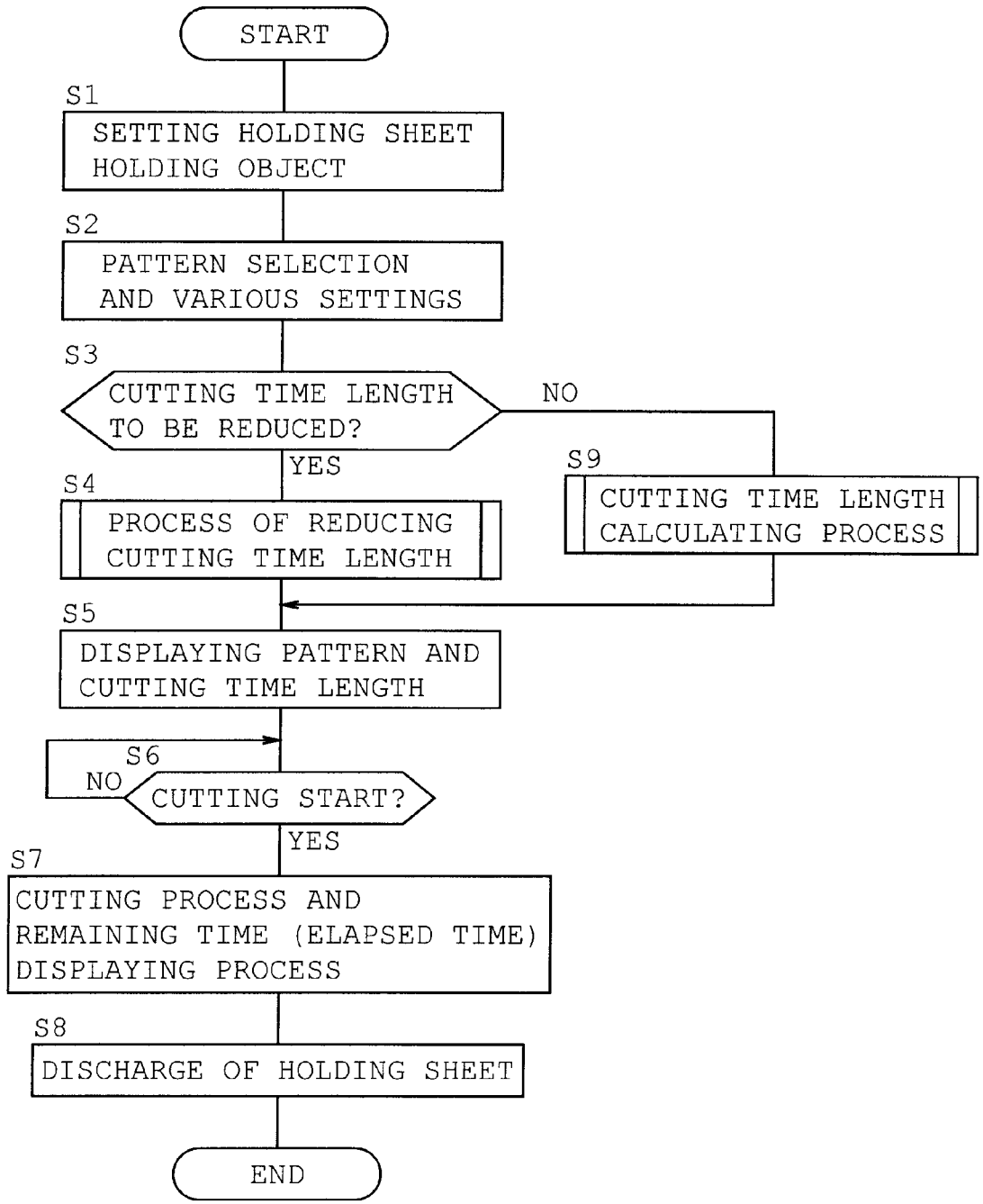
FIG. 10 is a flowchart of main processing, showing an overall processing flow.

More specifically, the control circuit 61 calculates a transit time in the case where the cutter 6 is relatively moved simultaneously in the X and Y directions to the cutting start point $P_0$, based on the lengths from the origin O as shown in FIG. 6A to the cutting start point $P_0$ of the pattern A1 in the X and Y directions and the speed data Vx and Vy in the feeding as shown in FIG. 8. Further, since the blade edge 6*a* of the cutter 6 is located at the raised position spaced from the object S in the feeding, the control device 61 adds a moving time of the cutter 6 in the up-down direction to a moving time in the X and Y directions, storing the addition in the RAM 63. (step S37). After having calculated the moving time to the cutting start point $P_0$, the control circuit 61 obtains coordinate data of the apex $P_1$ as a next destination (NO at steps S38 and S39), obtaining the line segment L1 connecting between the apexes $P_0$ and $P_1$ (step S32).

Since the coordinate data of the apex $P_1$ is not feed data (NO at step S33) in this case, the control circuit 61 obtains speed data Vx and Vy in the cutting, corresponding to the type (paper in this case) of the object S set at step S2 (step S34). Further, as shown in FIG. 7A, the cutting data indicates that the initial value of the arrangement angle of the pattern A1 is 0° (angle counter θc=0) and the line segment L1 from the cutting start point $P_0$ to the apex $P_1$ is parallel to the X direction. The control circuit 61 then calculates a cutting time length Tc of the line segment L1, based on the length of the line segment L1 and the speed data Vx (steps S36 and S37). The control circuit 61 subsequently obtains coordinate data of the apex $P_2$ which is a next destination (step S38 and NO at step S39) and further obtains a cutting time length of the line segment L2 connecting between the apexes $P_1$ and $P_2$ (step S32).

In this case, the control circuit 61 calculates a cutting time length of the line segment L2 based on the length of the line segment L2 and the speed data Vy in the same manner as the line segment L1 (steps S34 and S35). The control circuit 61 thus executes steps S32 to S34 and S36 to S39 to further accumulate cutting time lengths Tc of the remaining line segments L3 and L4, thereby calculating the cutting time lengths Tc of the line segments L1 to 14 of the pattern A1. The cutting time length Tc of the pattern A1 is stored in the RAM 63 together with the transit time to the cutting start point $P_0$ so that a total cutting time length can be calculated. The total cutting time length is an addition of the cutting time length Tc of the pattern A1 and the cutting time lengths of the remaining patterns A2 to A80. Subsequently, the control circuit 61 reads feed data of the pattern A2 at step S38. When determining that the calculation of the cutting time length Tc of the pattern A1 has been completed (YES at step S39), the control circuit 61 returns to step S23 in FIG. 12. Since the shortest cutting time length Tm is currently an initial value of 0 (YES at step S23), the shortest cutting time length Tm is updated by the current value, 0, of the angle counter θc (step S24).

In the embodiment, the control circuit 61 calculates the cutting time lengths Tc of the pattern at arrangement angles in the case where the pattern A1 is rotated about the center point $M_0$ while an arrangement angle of the pattern A1 is changed by the first unit angle θ1 (1°, for example) at a plurality of times (step S25, No at step S26, and steps S22 to S24). More specifically, the angle counter θc is set to 1 indicative of the first unit angle θ1 (step S25) so that the arrangement angle of the pattern A1 is changed from 0° as shown in FIG. 7A to 1°. Regarding the cutting time length Tc of the pattern A1, the line segments L1 and L3 are tilted by 1° relative to the X direction and the line segments L2 and L4 are tilted by 1° relative to the Y direction. Accordingly, the cutting time length Tc is rendered slightly shorter as compared with the cutting time length Tc in the case where the angle counter θc is 0 (step S22).

Figure 15:
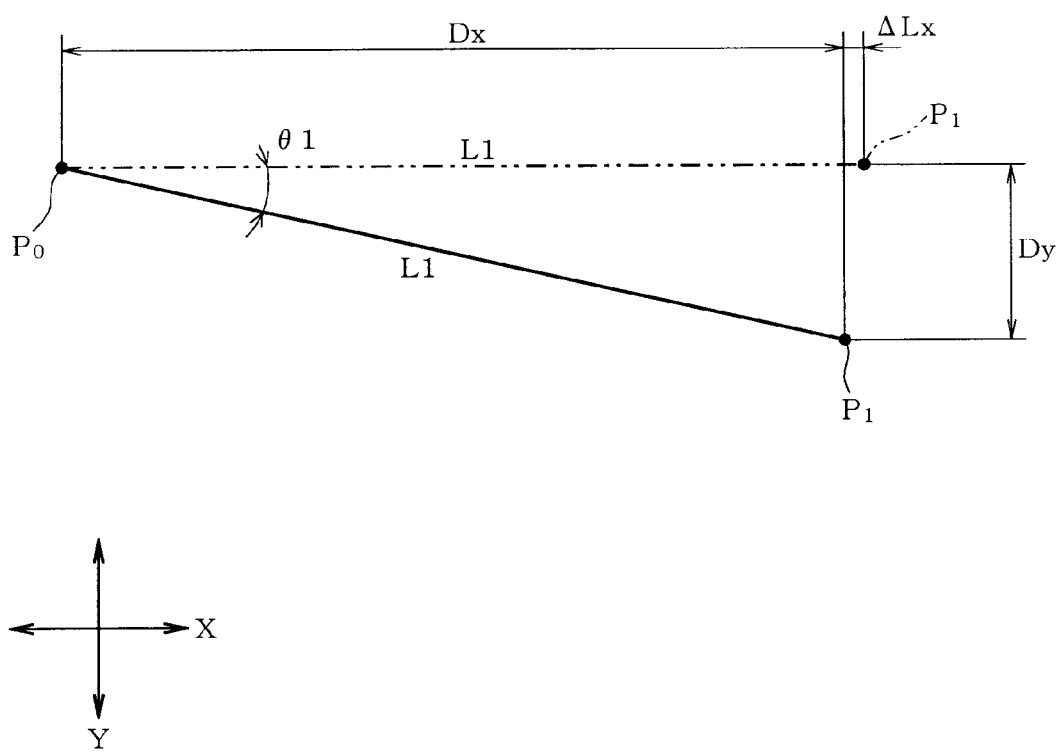
FIG. 15 is a diagrammatic view for explaining a unit angle.

Regarding processing at step S22 in this case, differences from the processing in the case where the angle counter θc is set at 0 will be described with reference to the schematic view of FIG. 15. In FIG. 15, the two-dot chain line shows the line segment L1 in a first case where the angle counter θc is set at 0, and the solid line shows the line segment L1 in a second case where the angle counter θc is set at 1. The cutting start point $P_0$ of the first case is caused to correspond with the cutting start point $P_0$ of the second case so that the first unit angle θ1 is exaggerated, for the sake of expedience.

When calculating a cutting time length with respect to the line segment L1 of solid line (step S32 in FIG. 13), the control circuit 61 calculates a longer one of X-direction length Dx and Y-direction length Dy, based on coordinate data of both ends P0 and P1. In this case, since the X-direction length Dx is longer than the Y-direction length Dy, the X-direction length is calculated. The x-direction length Dx is obtained by an equation, Dx=L1×cos θ1. Thus, the X-direction length is reduced by ΔLx=L1−Dx when the line segment L1 of solid line is tilted by ƒ1°. As a result, the cutting time length Tc required to cut the line segment L1 of solid line is reduced by the length ΔLx (steps S36 and S37). More specifically, the relative movement of the cutter 6 by the length Dx in the X direction and the relative movement of the cutter 6 by the length Dy in the Y direction are carried out simultaneously in the cutting of the line segment L1 of solid line. However, since Dx>Dy, the cutting time length Tc is reduced by the length ΔLx. Further, the reduced cutting time length Tc is calculated in the same manner as the line segment L1 regarding each one of the other line segments L2 to L4 of the pattern A1.

Figure 12:
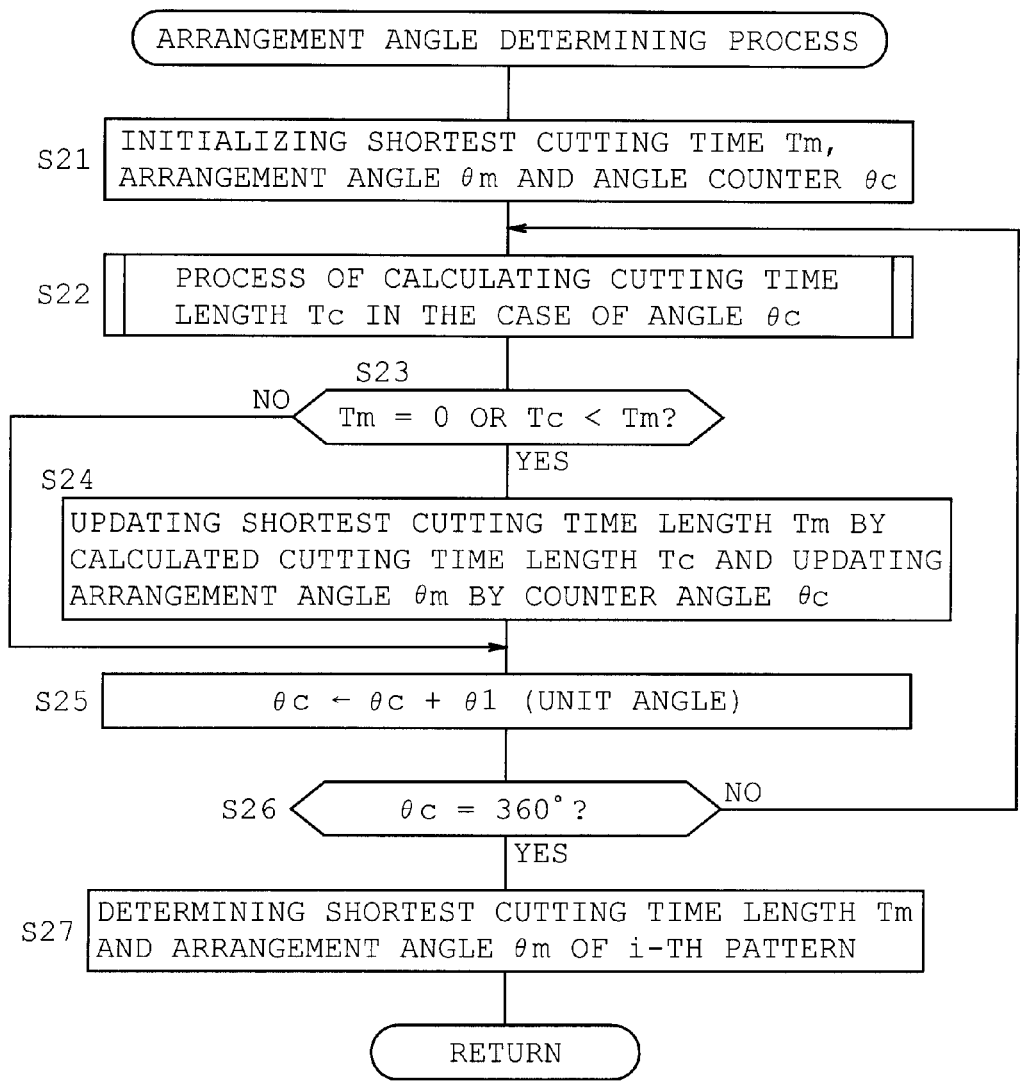
FIG. 12 is a flowchart of an arrangement angle determining process.
Figure 13:
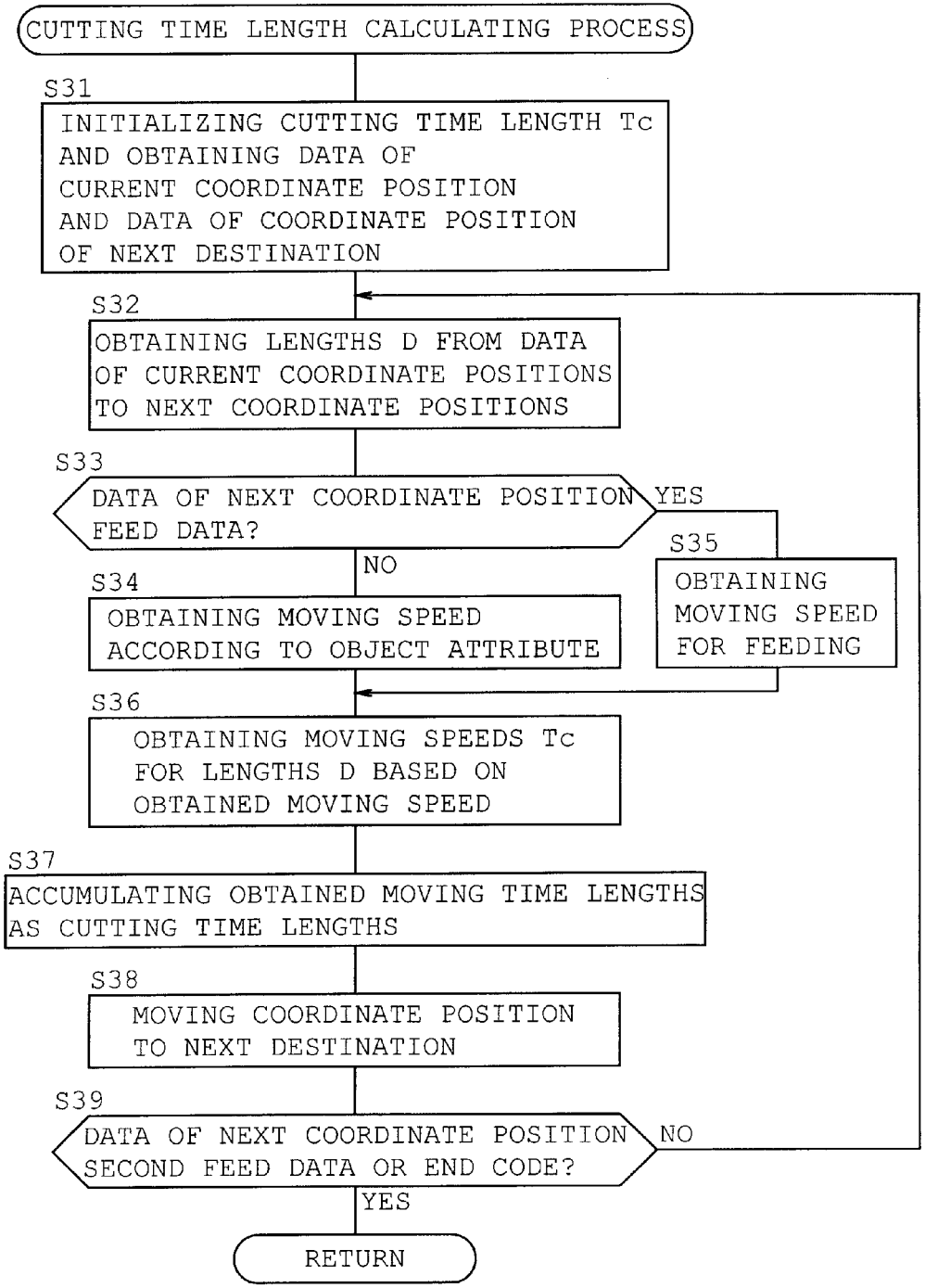
FIG. 13 is a flowchart of a cutting time length calculating process.

When the lengths of cutting time length Tc of the line segments L1 to L4 are accumulated regarding the pattern A1 in the case where the angle counter θc is set at 1 (YES at step S39), the control circuit 61 returns to step S23 in FIG. 12. The cutting time length Tc of the pattern A1 is shorter than the shortest cutting time length Tm in the case where the arrangement angle θm is set to 0 (YES at step S23). Hence, the values of the shortest cutting time length Tm and the arrangement angle θm are updated to the cutting time length Tc and the value 1 of the angle counter θc respectively (step S24).

Subsequently, the angle counter θc is incremented by 1 (step S25 and NO at step S26), and the step S22 is executed. As a result, a cutting time length Tc in the case where the arrangement angle of the pattern A1 is set to 2° is calculated. Thus, the steps S22 to S26 are repeatedly executed in the case where the angle counter θc indicates 2 and so on, that is, the arrangement angle of the pattern A1 is set to 2° to 359°, so that the cutting time length Tc of the pattern A1 is calculated when the arrangement angle takes each of 2° to 359°. In the case of the pattern A1, the shortest cutting time length Tm is obtained when the angle counter θc indicates each one of 45, 135, 225 and 315, as shown in FIG. 7B. Accordingly, when the angle counter θc has counted 360 (YES at step S26), the shortest cutting time length Tm is obtained, at the count of 45, so that the arrangement angle θm is determined to be 45° (step S27). The control circuit 61 causes the RAM 63 to store the determined shortest cutting time length Tm and arrangement angle θm for every pattern A1, returning to step S14 in FIG. 11.

Further, the control circuit 61 converts coordinate data including the feed data of the pattern A1, based on the determined arrangement angle θm, causing the RAM 63 to store the converted coordinate data (step S14). In this conversion, points $P_0$ to $P_4$ of the pattern A1 as shown in FIG. 7A are rotated 45° about the center point $M_0$, whereby a coordinate conversion is executed. As a result, the post conversion pattern A1 as shown in FIG. 7B is cut with the shortest cutting time length Tm being applied. More specifically, it is assumed that both speed data Vx and Vy are set to 1 cm/sec and that the lengths of all the line segments L1 to L4 of the pattern A1 are set to 1.4 cm. In this case, since it takes 1.4 seconds to cut each one of the line segments L1 to L4, the cutting time length of the pattern A1 in FIG. 7A amounts to 5.6 seconds (1.4 sec×4). On the other hand, pattern A1 having the arrangement angle θm of 45° is composed of the line segments L1 to L4 each of which has reduced X-direction and Y-direction lengths as shown by symbol "Db" in FIG. 7B. Accordingly, when the cutter 6 is relatively moved simultaneously in the Y-direction and the Y-direction, the time length required to cut each of the line segments L1 to L4 is 1.0 sec and the time length required to cut the pattern A1 becomes 4 sec (1.0 sec×4; and see FIG. 9). Consequently, the cutting time length of the pattern A1 is reduced by 1.6 sec (5.6 sec−4.0 sec=1.6 sec).

Subsequently, the counter i counts up (NO at step S15; and step S12) in the same manner as in the first pattern A1, and the process of determining an arrangement angle θm at which the shortest cutting time length Tm is obtained is executed regarding a second pattern A2 (step S13). In this case, the shortest cutting time length Tm, the arrangement angle θm and the angle counter θc are initialized (step S21 in FIG. 12), and the steps S22 to S26 are repeatedly executed regarding the second pattern A2. The pattern A2 is rotated by the first unit angle θ1 about the center point $M_0$, so that the cutting time lengths Tc of the pattern A2 are calculated regarding the respective arrangement angles. Since the second pattern A2 has the same configuration as the first pattern A1, the same shortest cutting time length Tm and the same arrangement angle θm of 45° as the first pattern A1 are determined regarding the second pattern A2 (step S27; and return to step S14). Further, coordinate conversion is executed regarding the coordinate data of the pattern A2, based on the determined arrangement angles θm (step S14).

Thus, the control circuit 61 repeatedly executes the steps S12 to S15 until the counter i determines that the count value corresponds with the pattern number n (YES at step S15). As a result, the control circuit 61 determines the shortest cutting time length Tm and the arrangement angle θm with respect to each of the patterns A1 to A80 and executes the coordinate conversion based on the arrangement angle, thereby generating new cutting data (full data). The control circuit 61 further adds all the shortest cutting time lengths Tm of patterns A1 to A80 determined at step S27, causing the RAM 63 to store the added total cutting time length (step S16).

The shortest cutting time lengths Tm of the patterns A1 to A80 are stored while the moving time in the feed and the cutting time lengths of line segments L1 to L4 are discriminated therebetween, whereby the cutting time length from which the moving time in the feed is excluded can be displayed (see the cutting time length display area 71b in FIG. 9). Further, an accurate total cutting time length inclusive of the moving time in the feed can be displayed. For example, a moving time length of the cutter 6 between the pattern A1 and the pattern A2 is calculated while the above-mentioned up-down movement time length of the cutter 6 is added to a time length calculated based on the coordinate data of the cutting end point $P_4$ of the pattern A1 and the cutting start point $P_0$ of the pattern A2 and the time length calculated based on the speed data Vx and Vy in the feed.

When completing the above-described cutting time length reducing process (step S4 in FIG. 10), the control circuit 61 causes the display 9a to display a time length display screen 100 (step S5). As shown in FIG. 9, the right pattern display area 70b of the time length display screen 100 displays the pattern A1 at the arrangement angle θm in the cutting start, and the cutting time length display area 71b displays the shortest cutting time length Tm of the pattern A1 and the total cutting time length of the patterns A1 to A80. In this case, the left pattern display area 70a may display the pattern A1 at the arrangement angle of 0°, and the cutting time length display area 71a may display a cutting time length of the pattern A1 (see step S9 as will be described later). Thus, display manners of the cutting time length area 71a and 71b are mere examples, and either the cutting time length of each pattern or the total cutting time length may be displayed. Further, the time length display screen 100 may display the total cutting time length on the second time scale, an elapsed time length from the cutting start to the cutting end of each of the patterns A1 to A80 and an elapsed time length from the cutting start of the pattern A1 to the cutting end of the pattern A80.

When the touch panel 9c is operated so that start of the cutting is instructed (YES at step S6), the control circuit 61 then executes the cutting operation based on newly generated full data (step S7). In this case, the control circuit 61 measures an elapsed time length from the cutting start, causing the time length display screen 100 to display remaining time lengths obtained by subtracting the elapsed time length from the shortest cutting time length Tm and the total cutting time length. More specifically, the shortest cutting time length Tm and the total cutting time length are decreased from the cutting start, so that a remaining time length and a total remaining time length are displayed on the cutting time length display area 71b.

In the time reduction mode, the cutter 6 is relatively moved simultaneously in the X direction at speed Vx and in the Y direction at speed Vy, thereby cutting the line segments L1 to L4 of the patterns A1 to A80 in a shortest cutting time length. Thus, as shown in FIG. 6B, the cutting line of each of the patterns A1 to A80 is formed at an arrangement angle of 45°, with the result that the cutting time length is reduced to be shorter than in the case where the cutting line is formed at an arrangement angle as shown in FIG. 6A.

Upon completion of the cutting of all the patterns A1 to A80, the remaining time length to the cutting end of the pattern A80 and the total remaining time length in the cutting time length display area 71b become 0 upon completion of the cutting of all the patterns A1 to A80. Subsequently, when the holding sheet 10 is transferred forward by the transfer mechanism 7 thereby to be discharged (step S8), the control circuit 61 completes processing (end).

On the other hand, the user sometimes desires to cut a pattern without changing its arrangement angle, depending upon a configuration of the pattern. In this case, the normal mode in which the pattern is cut without change in its arrangement angle is set instead of the time reduction mode (NO at step S3). When the cutting apparatus 1 has been set to the normal mode, the control circuit 61 executes the cutting time length calculating process at step S9 (see FIG. 14). In the cutting time length calculating process, the control circuit 61 sequentially reads coordinate data of the full data in FIG. 5 from the top and a cutting time length of each of the patterns A1 to A80 and a total cutting time length of the patterns A1 to A80 without changing arrangement angles of the patterns.

Figure 14:
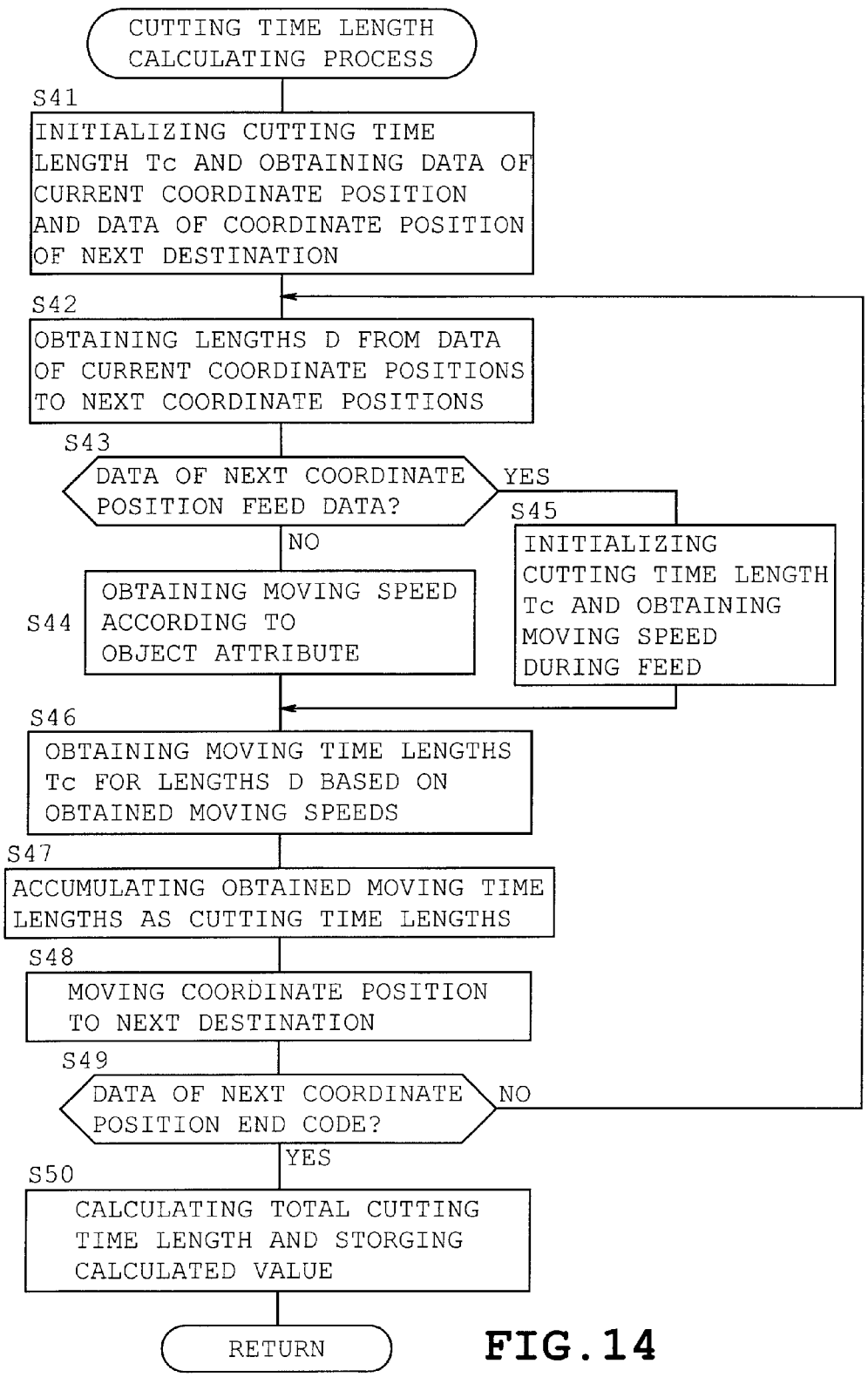
FIG. 14 is a flowchart of a cutting time length calculating process in the case where the cutting time length is not shortened.

More specifically, the control circuit 61 proceeds to step S41 in FIG. 14 to initialize the cutting time length Tc to 0 and to obtain coordinate data of the standby position (origin O) of the carriage 19 and coordinate data of a cutting start point $P_0$ of the pattern A1 as a next destination. The control circuit 61 then obtains X-direction and Y-direction lengths from the origin O to the cutting start point $P_0$ of the pattern A1, based on the obtained coordinate data (step S42).

Coordinate data of the destination is feed data in this case (YES at step S43). The control circuit 61 calculates a moving time length required for the relative movement of the cutter 6 simultaneously in the X and Y directions, based on the X-direction and Y-direction lengths obtained at step S42 and speed data Vx and Vy during the feed (steps S45 and S46). The control circuit 61 further adds a moving time length of the cutter 6 to the lowered position to the calculated moving time, causing the addition in the RAM 63 (step S47). After having calculated the moving time length to the cutting start point $P_0$, the control circuit 61 obtains coordinate data of apex P1 which is a next destination (step S48 and NO at step S49) and obtains a cutting time length required to cut the line segment L1 connecting between apexes $P_0$ and $P_1$ (step S42).

The control circuit 61 calculates the length of line segment L1 of the pattern A1, which line segment is parallel to the X direction (step S42), as shown in FIG. 7A. Since coordinate data of the apex $P_1$ is not feed data (NO at step S43), the control circuit 61 obtains paper speed data Vx and Vy (step S44). The control circuit 61 then calculates a cutting time length Tc of the line segment L1 based on the length of the line segment L1 and the speed data Vx (steps S36 and S37). The control circuit subsequently obtains coordinate data of apex $P_2$ which is a next destination (step S48 and NO at step S49) and calculates a cutting time length required to cut the line segment L2 connecting between the apexes $P_1$ and $P_2$, (step S42).

In this case, the control circuit 61 calculates a cutting time length of the line segment L2 based on the length of the line segment L2 and the speed data Vy (steps S44 and S46) in the same manner as the line segment L1 (NO at step S43). The calculated value is added to the cutting time length Tc of the line segment L1 (step S47). Thus, the control circuit 61 executes steps S42 to S44 and S46 to S49 to add cutting time lengths Tc of the remaining line segments L3 and L4, calculating a cutting time length Tc of the line segments L1 to L4 of the pattern A1. The cutting time length Tc of the pattern A1 is stored together with the mobbing time length to the cutting start point $P_0$ in the RAM 63 so that a total cutting time length period is obtained by adding the cutting time length Tc of the pattern A1 and cutting time lengths of the remaining patterns A2 to A80.

The control circuit 61 subsequently obtains coordinate data of cutting start point P0 of a pattern A2 which is a next destination (step S48 and NO at step S49) and calculates X-direction and Y-direction lengths from the cutting end point $P_4$ of the pattern A1 to the cutting start point $P_0$ of the pattern A2 (step S42). Since the coordinate data of destination is feed data in this case (YES at step S43), the control circuit 61 initializes the cutting time length Tc to calculate a cutting time length Tc of each pattern A2, thereby obtaining speed data Vx and Vy during feeding (step S45). Based on the obtained speed data Vx and Vy and the X-direction and Y-direction lengths obtained at step S42, the control circuit 61 calculates a moving time length required to relatively move the cutter 6 to the cutting start point P0 of the pattern A2, storing the obtained moving time length (steps S46 and S47). The control circuit 61 further executes steps S42 to S49 to calculate a cutting time length Tc of line segments L1 to L4 of the pattern A2 and cause the RAM 63 to store the obtained cutting time length Tc.

The control circuit 61 repeatedly executes steps S42 to S43 until reading the end code at the end of the full data (YES at step S49). As a result, the control circuit 61 calculates the cutting time length Tc of each of second and subsequent patterns A2 to A80 and causes the RAM 63 to store the obtained cutting time length together with the moving time length. Further, the control circuit 61 adds all these time lengths and obtains a total cutting time length of the patterns A1 to A80 to cause the RAM 63 to store the obtained total cutting time length (step S50), returning to step S5 in FIG. 10.

The control circuit 61 then causes the time length display screen 100 to display the cutting time length Tc of the pattern A2 calculated in the above-described cutting time length calculating process and the total cutting length of all the patterns A1 to A80 (step A5). The cutting time length TC and the total cutting time length are displayed so as to correspond to the pattern A1 on the left pattern display area 70*a*. Further, when the touch panel 9*c* is touched in order that the cutting start in the normal mode may be instructed (YES at step S6), the control circuit 61 executes a cutting operation based on the full data (step S7). In this case, the control circuit 61 measures an elapsed time length from the cutting start and executes countdown of the cutting time length Tc and the total cutting time length to cause the cutting time length display area 71*a* to display a remaining time length and a total remaining cutting time length.

Upon completion of the cutting of all the patterns A1 to A80, the remaining time length to the cutting end of the pattern A80 and the remaining total cutting time length in the cutting time length display area 71*a* become 0. Subsequently, the control circuit 61 causes the transfer mechanism 7 to transfer the holding sheet 10 forward to discharge the same (step S8), completing the sequence of processing (END).

As understood from the foregoing, the cutting apparatus 1 is configured to cut a desirable pattern out of the object S by moving the cutter 6 serving as the cutting device and the object S relative to each other. The cutting apparatus 1 includes the display unit displaying at least information about the cutting of the pattern and the display control unit causing the display unit to display the cutting time length required to cut the pattern.

According to the above-described construction and configuration, the display control unit causes the display unit to display the cutting time length required to cut the pattern. Since the user can understand the cutting time length required to cut the pattern, the cutting apparatus 1 can be rendered more convenient.

The control circuit 61 executing steps S31 to S39 and S41 to S50 serves as a cutting time length calculating unit which calculates a time length required to cut a pattern based on the cutting data to cut the pattern. The display control unit causes the display unit to display the cutting time length calculated by the cutting time length calculating unit. According to this configuration, an accurate cutting time length can be calculated by the cutting time length calculating unit.

The control circuit 61 executing steps S34, S35, S44 and S45 serves as a correcting unit which corrects the cutting time length calculated by the cutting time length calculating unit according to the type of the object S. The display control unit causes the display unit to display the cutting time length corrected by the correcting unit. According to this configuration, error in the cutting time length due to the type of the object S can be eliminated as much as possible with the result that a more accurate cutting time length can be displayed.

The cutting apparatus 1 includes the storage unit storing a plurality of types of patterns and a pattern designating unit designating a desired one of the patterns stored in the storage unit. When a plurality of patterns is designated by the pattern designating unit thereby to be cut, the cutting time length calculating unit calculates cutting time lengths of the patterns and/or a total cutting time length obtained by adding the cutting time lengths of the patterns together, based on cutting data of the patterns designated by the pattern designating unit. The display control unit causes the display unit to display the cutting time lengths of the patterns and/or the total cutting time length.

According to this configuration, a desired pattern can be designated by the pattern designating unit and a cutting time length required to cut the designated pattern can be displayed. Further, when a plurality of patterns is designated by the pattern designating unit, an accurate cutting time length of the designated pattern and/or an accurate total cutting time length of the designated patterns can be calculated based on the cutting data of the pattern and/or patterns. The plurality of patterns should not be limited to those of the patterns A1 to A80 having the same configuration. A plurality of patterns having different, configurations may be designated. In this case, too, the same advantageous effect as described above can be achieved.

The display control unit causes the display unit to display the pattern and the cutting time length required to cut the pattern in correspondence with each other. According to this configuration, for example, when a plurality of patterns is to be cut, the user can understand cutting time lengths of the respective patterns accurately and easily.

The control circuit 61 serves as an elapsed time length calculating unit which calculates time elapsed since start of pattern cutting operation and as a remaining time length calculating unit which calculates a remaining time length before completion of pattern cutting based on the cutting time length calculated by the cutting time length and the elapsed time length calculated by the elapsed time length calculating unit. The display control unit causes the display unit to display the remaining time length calculated by the remaining time length calculating unit.

According to this configuration, since the calculated remaining time length is displayed, the user can understand a time length required before completion of pattern cutting, with the result that the cutting apparatus 1 can be rendered more convenient.

When a plurality of patterns is designated by the pattern designating unit thereby to be cut, the remaining time length calculating unit calculates a remaining time length before completion of pattern cutting with respect to each designated pattern and/or a remaining time length before completion of pattern cutting with respect to all the designated patterns, based on the cutting time length of each pattern calculated by the cutting time length calculating unit and/or the total cutting time length obtained by adding the cutting time lengths of the designated patterns, and the elapsed time length calculated by the elapsed time length calculating unit. The display control unit causes the display unit to display the remaining time length before completion of pattern cutting with respect to each designated pattern and/or the remaining time length before completion of pattern cutting with respect to ail the designated patterns, both time lengths being calculated by the remaining time length calculating unit.

According to this configuration, when a plurality of patterns is designated by the pattern designating unit, it is possible to accurately calculate the time length required before completion of pattern cutting with respect to each designated pattern and/or the time length required before completion of pattern cutting with respect to all the designated patterns.

The display control unit causes the display unit to display the elapsed time length calculated by the elapsed time length calculating unit. According to this configuration, the user can understand the elapsed time length without beginning timing from start of pattern cutting.

The foregoing embodiment should not be restrictive and may be modified or expanded as follows. The invention should not be limited to the above-described cutting apparatus 1 and may be applied to various types of apparatuses each of which is provided with a device or unit moving the cutting device and the object S relative to each other.

Further, the cutting data of each pattern may include data of cutting time length. The cutting time length data may be data set based on actually measured values, for example. In this case, the cutting time length calculating process can be eliminated. For example, in the normal mode (NO at step S3), it is determined whether or not the cutting data includes the cutting time length data, before execution of the cutting time length calculating process (step S9). Step S9 is executed when the cutting data does not include the cutting time length data. When the cutting data includes the cutting time length data, the control sequence may proceed to step S5.

The correcting unit correct the cutting time length according to the material type of the object S such as paper or felt in the foregoing embodiment. However, the correcting unit may correct the cutting time length according to a thickness of the object S. The storage unit should not be limited to the ROM 62 or the external memory 65 and may be another internal storage unit incorporated in the cutting apparatus 1 or another external storage unit detachably attached to the cutting apparatus 1. Further, the time display screen 100 may display at least the cutting time length display area 71. The pattern display areas 70a and 70b of the time display screen 100 may display respective patterns designated by the pattern designating unit and having different configurations.

The processing program, stored in the storage unit in the cutting apparatus 1 may be stored in a non-transitory computer-readable storage medium including a USB memory, a CD-ROM, a flexible disc, a DVD and a flash memory. In this case, the processing program stored in the storage medium is read by computers of the apparatuses provided with the moving devices and cutting devices thereby to be executed, with the result that the same advantageous effects as in the foregoing embodiments can be achieved.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

I claim:

1. A cutting apparatus for cutting a plurality of patterns out of an object, comprising:
    a driving roller configured to move the object in a first direction;
    a first motor configured to drive the driving roller;
    a cutter cartridge having a cutter configured to cut the patterns out of the object;
    a cutting head having a cartridge holder which holds the cutter cartridge;
    a second motor configured to move the cutting head in a second direction perpendicular to the first direction;
    wherein the patterns are cut out of the object by moving the object and cutting head with a cutting edge of the cutter penetrating the object;
    a display unit configured to display at least information about cutting of the patterns; and
    a control device configured to:
        obtain lengths of line segments composing a cutting line of the patterns respectively, based on cutting data for cutting the patterns;
        calculate a time length required to cut each line segment, based on the obtained lengths of the respective line segments and a speed of the movement of the object and a speed of the movement of the cutting head;
        obtain a length from an end point of cutting for one of the patterns to a starting point of cutting for another of the patterns, based on the cutting data;
        calculate a moving time required to move the cutting head from the end point to the starting point, based on the length from the end point to the starting point obtained and the speed of the movement of the object and the speed of the movement of the cutting head;
        calculate a total cutting time length required to cut the patterns by accumulating the time lengths required to cut the respective line segments and the moving time calculated; and
        cause the display unit to display the calculated total cutting time length required to cut the patterns.

2. The cutting apparatus according to claim 1, further comprising:
    a third motor configured to move the cartridge holder in a third direction perpendicular to the first direction and the second direction;
    the control device is further configured to:
        calculate the total cutting time length by accumulating the time lengths required to cut the respective line segments and a moving time required to move the cartridge holder in the third direction from the end point to the starting, point respectively.

3. The cutting apparatus according to claim 1, wherein the control device is further configured to:
    set a type of the object;
    correct the calculated cutting time length required to cut each line segment according to the type of the object; and
    cause the display unit to display the total cutting time length accumulated, the corrected time length required to cut each line segment, and the moving time.

4. The cutting apparatus according to claim 1,
    wherein the control device is further configured to:
        calculate a cutting time length of each pattern by accumulating the time lengths required to cut the respective line segments for each pattern based on the cutting data;
        cause the display unit to display the calculated cutting time length of each pattern and the total cutting time length.

5. The cutting apparatus according to claim 4, wherein the control device is further configured to cause the display unit to display: one of the patterns, the cutting time length for the one of the patterns, and the total cutting time length for all of the patterns.

6. The cutting apparatus according to claim 1, wherein the control device is further configured to:
    calculate a time length elapsed since a start of an operation of cutting the patterns;
    calculate a remaining time length before an end of all the pattern cutting operations for the patterns based on the calculated total cutting time length and the calculated elapsed time length; and cause the display unit to display the calculated remaining time length before the end of all the pattern cutting operations for the patterns.

7. The cutting apparatus according to claim 6, wherein the control device is further configured to:
calculate a cutting time length of each pattern by accumulating the time lengths required to cut the respective line segments for each pattern based on the cutting data;
calculate a remaining time length before an end of the pattern cutting operation for each pattern based on the cutting time length of each pattern and the calculated elapsed time length; and
cause the display unit to display the calculated remaining time length of each pattern and the calculated remaining time length of all the patterns.

8. The cutting apparatus according to claim 1, wherein the control device is further configured to:
calculate a time length elapsed since a start of an operation of cutting the patterns; and
cause the display unit to display the calculated elapsed time length.

9. A non-transitory computer-readable medium storing a program for a cutting apparatus having:
a driving roller configured to move an object in a first direction;
a first motor configured to drive the driving roller;
a cutter cartridge having a cutter configured to cut a plurality of patterns out of the object;
a cutting head having a cartridge holder which holds the cutter cartridge;
a second motor configured to move the cutting head in a second direction perpendicular to the first direction;
wherein the patterns are cut out of the object by moving the object and cutting head with a cutting edge of the cutter penetrating the object;
a display unit configured to display at least information about cutting of the patterns; and
a control device configured to execute the program,
the program comprising instructions for:
obtaining lengths of line segments composing a cutting line of the patterns for respectively, based on cutting data for cutting the patterns;
calculating a time length required to cut each line segment, based on the obtained lengths of the respective line segments and a speed of the movement of the object and a speed of the movement of the cutting head;
obtaining a length from an end point of cutting for one of the patterns to a starting point of cutting for another of the patterns, based on the cutting data;
calculating a moving time required to move the cutting head from the end point to the starting point, based on the length from the end point to the starting point obtained and the speed of the movement of the object and the speed of the movement of the cutting head;
calculating a total cutting time length required to cut the patterns by accumulating the time lengths required to cut the respective line segments and the moving time calculated; and
causing the display unit to display the calculated total cutting time length required to cut the patterns.

10. The medium according to claim 9, wherein the cutting apparatus further has a third motor configured to move the cartridge holder in a third direction perpendicular to the first direction and the second direction;
the program further comprises instructions for:
calculating the total cutting time length by accumulating the time lengths required to cut the respective line segments and a moving time required to move the cartridge holder in the third direction at the end point and the starting point respectively.

11. The medium according to claim 9, wherein the program further comprises instructions for:
setting a type of the object;
correcting the calculated cutting time length required to cut each line segment according to the type of the object; and
causing the display unit to display the total cutting time length accumulated, the corrected time length required to cut each line segment, and the moving time.

12. The medium according to claim 9, wherein the program further comprises instructions for:
calculating a cutting time length of each pattern by accumulating the time lengths required to cut the respective line segments for each pattern based on the cutting data;
causing the display unit to display the calculated cutting time length of each pattern and the total cutting time length.

13. The medium according to claim 12, wherein the program further comprises instructions for causing the display unit to display: one of the patterns, the cutting time length for the one of the patterns, and the total cutting time length for all of the patterns.

14. The medium according to claim 9, wherein the program further comprises instructions for:
calculating a time length elapsed since a start of an operation of cutting the patterns;
calculating a remaining time length before an end of all the pattern cutting operations for the patterns based on the calculated total cutting time length and the calculated elapsed time length; and
causing the display unit to display the calculated remaining time length before the end of all the pattern cutting operations for the patterns.

15. The medium according to claim 14, wherein the program further comprises instructions for:
calculating a cutting time length of each pattern by accumulating the time lengths required to cut the respective line segments for each pattern based on the cutting data;
calculating a remaining time length before an end of the pattern cutting operation for each pattern, based on the cutting time length of each pattern and the calculated elapsed time length; and
causing the display unit to display the calculated remaining time length of each pattern and the calculated remaining time length of all the patterns.

16. The medium according to claim 9, wherein the program further comprises instructions for:
calculating a time length elapsed since start of an operation of cutting the patterns; and
causing the display unit to display the calculated elapsed time length.

\* \* \* \* \*